US008143572B2

(12) United States Patent
Scigocki

(10) Patent No.: US 8,143,572 B2
(45) Date of Patent: Mar. 27, 2012

(54) METHOD AND SYSTEM OF TANDEM MASS SPECTROMETRY WITHOUT PRIMARY MASS SELECTION FOR MULTICHARGED IONS

(75) Inventor: David Scigocki, Saint Vallier de Thiey (FR)

(73) Assignee: Physikron, Boulogne Billancourt (FR)

( * ) Notice: Subject to any disclaimer, the term of this patent is extended or adjusted under 35 U.S.C. 154(b) by 544 days.

(21) Appl. No.: 12/306,502

(22) PCT Filed: Jul. 2, 2007

(86) PCT No.: PCT/EP2007/056655

§ 371 (c)(1),
(2), (4) Date: Dec. 23, 2008

(87) PCT Pub. No.: WO2008/003684

PCT Pub. Date: Jan. 10, 2008

(65) Prior Publication Data

US 2009/0250605 A1 Oct. 8, 2009

(30) Foreign Application Priority Data

Jul. 3, 2006 (FR) ...................................... 06 05985
Apr. 12, 2007 (WO) ................. PCT/EP2007/053573
May 24, 2007 (FR) ...................................... 07 03661

(51) Int. Cl.
*B01D 59/44* (2006.01)

(52) U.S. Cl. ......................... 250/282; 250/281; 250/287

(58) Field of Classification Search .......... 250/281–283, 250/287, 288, 290–299
See application file for complete search history.

(56) References Cited

U.S. PATENT DOCUMENTS 4,472,631 A 9/1984 Enke (Continued)

FOREIGN PATENT DOCUMENTS

EP 1047108 10/2000

(Continued)

OTHER PUBLICATIONS

Christian Noah P.; Improved Calibration of Time-of-Flight Mass Spectra by Simplex Optimization of Electrostatic Ion Calculations; Analytical Chemistry; American Chemical Society, Columbus, US, vol. 72, No. 14, Jul. 15, 2000, pp. 3327-3337.

(Continued)

*Primary Examiner* — Bernard E Souw
(74) *Attorney, Agent, or Firm* — Blakely, Sokoloff, Taylor & Zafman

(57) ABSTRACT

The invention proposes a method of tandem mass spectrometry for use in a mass spectrometer having a known characteristic function of the mass-to-charge ratio of the ions to be analysed, characterized in that it comprises the following steps: (a) providing a primary ions source to be analysed, (b) generating a primary mass spectrum of the primary ions, without dissociation, wherein said spectrum contains primary ion peaks of occurrence, (c) from the characteristic function values at the maxima of at least some of said primary mass peaks and from the charge values associated to said peaks, determining correlation laws that all possible multiplets of characteristic function values corresponding to multiplets of charged fragments resulting from the dissociation of parent primary ions of interest corresponding to said primary mass peaks have to meet, (d) concurrently dissociating primary ions of interest associated to primary mass peaks, in order to obtain multiplets of charged fragments from each of said parent primary ions, (e) generating characteristic function values for the dissociated fragments, (f) forming every potential multiplet of said characteristic function values, (g) identifying, from amongst said potential multiplets, the multiplets which meet a proximity criterion in relation to said correlation laws, in order to determine the real multiplets of charged fragments corresponding to the parent primary ions, (h) generating dissociation mass spectra corresponding respectively to the parent primary ions of interest, comprising the peaks associated to the real multiplets of identified fragments.

36 Claims, 10 Drawing Sheets

U.S. PATENT DOCUMENTS

| | | | | |
|---|---|---|---|---|
| 5,538,897 | A | 7/1996 | Yates | |
| 6,348,688 | B1 * | 2/2002 | Vestal | 250/287 |
| 6,770,870 | B2 * | 8/2004 | Vestal | 250/281 |
| 6,933,497 | B2 | 8/2005 | Vestal | |
| 7,034,292 | B1 * | 4/2006 | Whitehouse et al. | 250/289 |
| 7,582,864 | B2 * | 9/2009 | Verentchikov | 250/290 |
| 7,858,926 | B1 * | 12/2010 | Whitehouse et al. | 250/281 |
| 2002/0049307 | A1 * | 4/2002 | Aebersold et al. | 530/409 |
| 2002/0102610 | A1 * | 8/2002 | Townsend et al. | 435/7.1 |
| 2002/0117616 | A1 * | 8/2002 | Vestal | 250/287 |
| 2003/0034448 | A1 | 2/2003 | Yefchak | |
| 2006/0183238 | A1 * | 8/2006 | Nimkar et al. | 436/111 |
| 2007/0037286 | A1 * | 2/2007 | Purkayastha | 436/128 |
| 2007/0158545 | A1 * | 7/2007 | Verentchikov | 250/282 |

FOREIGN PATENT DOCUMENTS

| | | |
|---|---|---|
| EP | 1385194 | 1/2004 |

OTHER PUBLICATIONS

Wilski Witold, et al.; Calibration of mass spectrometric peptide mass fingerprint data without specific external or internal calibrants; BMC Bioinformatics, Biomed Central, London, GB, vol. 6, No. 1; Aug. 15, 2005; 17 pages.

Shi, H., Stone, D.; "Comparison and interconversion of the two most common frequency-to-mass calibration functions for Fourier arnsform ion cyclotron resonance mass spectrometry", Int'l Journal of Mass Spectrometry, Elsevier Science Publishers, Amsterdam, NL, vol. 195-196, Jan. 2000, pp. 591-598.

Standing, K.G. et al.; "Secondary Ion Time-of-Flight Mass Spectrometers and Data Systems"; Analytical Instrumentation, 16(1) (1987), pp. 173-189.

Negra, Serge Della, et al.; New Method for Metastable Ion Studies with a Time of Flight Mass Spectrometer. Future Applications to Molecular Strucgture Determinations, Institut de Physique Nucleair, B.P., No. 1, F-91406 Orsay Cedex, France, Anal. Chem. 1985, 57, pp. 2035-2040.

* cited by examiner

METHOD AND SYSTEM OF TANDEM MASS SPECTROMETRY WITHOUT PRIMARY MASS SELECTION FOR MULTICHARGED IONS

This is a non-provisional application claiming the benefit of International application number PCT/EP2007/056655 filed Jul. 2, 2007.

FIELD OF THE INVENTION

The invention relates to the general field of mass spectrometry.

STATE OF THE ART

By way of a reminder, mass spectrometry (MS), whatever its type, generally includes steps used to identify the molecules present in a sample by measuring the mass of these molecules after they have been ionised, accelerated and injected into a mass spectrometer.

A mass spectrometer generates a mass spectrum of the various molecules contained in the analysed sample, as a function of the value of the mass-to-charge ratio (M/Q) (M being the mass and Q the charge) of the ions generated, in the form of the current intensity of the ions detected by an ion detector in relation to a function of the mass-to-charge ratio F(M/Q) of the ions which is characteristic of the mass spectrum used, and is generally of the form:

$$F\left(\frac{M}{Q}\right) = G \times \frac{M}{Q}$$

where G is a function which depends on the type of spectrometer used, and which in independent from the mass-to-charge ratio of the ions.

The main mass spectrometers used are time-of-flight spectrometers, magnetic sector spectrometers, quadrupolar mass spectrometers, 3D ion traps, 2D ion traps, and FT-ICR mass spectrometers (for Fourier transform ion cyclotron resonance spectrometer).

The specific forms of operation, embodiments and the characteristic function corresponding to each of said mass spectrometers are known by the skilled person.

For a linear time-of-flight mass spectrometer, the characteristic function is the time-of-flight of the ions raised to the square $TOF^2$:

$$F\left(\frac{M}{Q}\right) = TOF^2\left(\frac{M}{Q}\right) = \frac{L^2}{2V_0} \times \frac{M}{Q}$$

where:

L is the distance of the linear time-of-fight between the pulsation of the ions set and their detection, and $V_0$ is the ions acceleration tension.

For a magnetic sector spectrometer, the characteristic function is the variable magnetic field $B^2$ applied within the magnetic sector raised to the square, which filters the ions relative to their mass-to-charge ratio (M/Q) and sends them towards an ion detector:

$$F\left(\frac{M}{Q}\right) = B^2\left(\frac{M}{Q}\right) = \frac{2V_0}{R_0^2} \times \frac{M}{Q}$$

where:

R is the magnetic sector radius, and $V_0$ is the ions acceleration tension.

For a quadrupolar mass spectrometer, the characteristic function is the variable tension $V_Q$ applied in the quadrupolar to filter the ions relative to their mass-to-charge ratio (M/Q) and to send them towards an ion detector:

$$F\left(\frac{M}{Q}\right) = V_Q\left(\frac{M}{Q}\right) = G_Q \times \frac{M}{Q}$$

For an ion trap spectrometer, the characteristic function is the variable tension $V_{IT}$ applied to the ion trap to eject the ions relative to their mass-to-charge (M/Q) ratio towards an ion detector:

$$F\left(\frac{M}{Q}\right) = V_{IT}\left(\frac{M}{Q}\right) = G_{IT} \times \frac{M}{Q}$$

For a FT-ICR spectrometer, the characteristic function is the cyclotron angular frequency $\omega_{FTICR}$ corresponding to each mass-to-charge M/Q value of the ions, whose Fourier transform analysis and measurement allow the generation of a mass spectrum:

$$F\left(\frac{M}{Q}\right) = \omega_{FTICR}\left(\frac{M}{Q}\right) = G_{FTICR} \times \frac{M}{Q}$$

where $G_{FTICR}$ is the magnetic field strength.

In particular, tandem mass spectrometry (MS-MS) is well known and used when the primary mass spectrum does not allow the identification of the analysed ions. It generally includes steps required to generate, by means of a first mass spectrometer, a primary mass spectrum (MS) of the ionised molecules present in the analysed sample, to perform a step for the selection of a primary mass, and then to fragment, i.e. to dissociate by means of a dissociation device, the primary ions of said selected primary mass, so as to generate a mass spectrum described as the dissociation mass spectrum of the charged fragments coming from the dissociation of said primary ions, by means of a second mass spectrometer.

The primary mass selection, generally implemented to realise each dissociation mass spectrum, limits the acquisition debit of the tandem mass spectrometer, as the mass spectra are generated one after the other.

It also limits the sensitivity of the tandem mass spectrometer, this sensitivity being defined as the amount of samples consumed to generate each mass dissociation spectrum, the remaining unselected ions provided by the ion source being actually eliminated for the generation of the mass spectrum of the selected primary ions.

The primary ions dissociation can be performed at high kinetic energy (about 0.8 to 20 keV) or low kinetic energy (about 10 to 200 eV).

Low kinetic energy dissociation can be used with any existing mass spectrometers, while high kinetic energy dissociation is generally used with tandem magnetic sector mass spectrometers or tandem time-of-flight mass spectrometers.

In the case of low kinetic energy dissociation, the characteristic function of the dissociated charged fragments only depends on the mass-to-charge ratio m/q of the dissociated fragments, and does not depend on the mass-to-charge ratio M/Q of the parent primary ion.

In the case of high kinetic energy dissociation, the characteristic function F'(m/q) of the dissociated charged fragments generally depends on the mass-to-charge ratio m/q of the charged fragments and on the mass-to-charge ratio M/Q of the parent primary ion. As a consequence, for an identical mass spectrometer, the characteristic function of the non-dissociated primary ions will differ from the characteristic function of the charged fragments.

Furthermore, the characteristic function of the charged fragments generally cannot be written under the form:

$$F'\left(\frac{m}{q}\right) = G' \times \frac{m}{q}.$$

In the particular case of time-of-flight mass spectrometry, in addition to the tandem time-of-flight mass spectrometers described previously with primary mass selection, tandem time-of-flight mass spectrometers without primary mass selection are also well known.

These can be used to generate several dissociation mass spectra simultaneously.

Methods of time-of-flight mass spectrometry without primary mass selection [1] [2] [3] [4] are also well known, which nevertheless necessitate several acquisitions in order to generate the different dissociation spectra, but with a lower number of successive acquisitions in relation to the appliances using primary mass selection.

Is known in particular a method of tandem time-of-flight mass spectrometry employed to generate several dissociation mass spectra without primary mass selection in a single acquisition [5]. It is a method of time-of-flight mass spectrometry without primary mass selection based on conversion of the times-of-flight into measured positions. This method limits the range of primary masses simultaneously accessible.

The methods [1] [2] [3] [4] and [5] are only compatible with the primary ions dissociation at high kinetic energy.

The dissociation of single-charged primary ions is simple, and generally limited to the production of pairs comprising a neutral fragment and a single-charged fragment, while the dissociation of multicharged primary ions may be complex and leads to several potential dissociation channels [6]. The two main families of dissociation channels are fragmentation into multiplets of charged fragments (such as pairs and triplets of charged fragments) and into multiplets of fragments comprising charged and neutral fragments.

If M and Q are respectively denoted as the mass and the electric charge of the parent primary ion, and $m_i$ and $q_i$ are the mass and the electric charge of each dissociated fragment i (where i=1, 2 or 3), then the main dissociation channels into pairs of fragments are [6]:

$$M(Q) \rightarrow m_1(q_1) + m_2(q_2), \quad \text{(a)}$$

where $m_1+m_2=M$ and $q_1+q_2=Q$, $$M(Q) \rightarrow m_1(q_1=Q) + m_2(q_2=0), \quad \text{(b)}$$

where $m_1+m_2=M$, while the three main dissociation channels into triplets of fragments are [6]:

$$M(Q) \rightarrow m_1(q_1) + m_2(q_2) + m_3(q_3), \quad \text{(c)}$$

where $m_1+m_2+m_3=M$ and $q_1+q_2+q_3=Q$, $$M(Q) \rightarrow m_1(q_1) + m_2(q_2) + m_3(q_3=0), \quad \text{(d)}$$

where $m_1+m_2+m_3=M$ and $q_1+q_2=Q$, $$M(Q) \rightarrow m_1(q_1=Q) + m_2(q_2=0) + m_3(q_3=0), \quad \text{(e)}$$

where $m_1+m_2+m_3=M$.

Besides, the parent primary ion might drop an electron during the dissociation (for instance during an "Induced Collisions Dissociation" (CID) between the primary ion and molecules of a gas), or capture an electron (for instance during an "Electron Capture Dissociation" (ECD)). The sum of the fragment charges is therefore no longer equal to Q but to Q'=Q+/−e (where e is the electric charge unit).

No technique of tandem mass spectrometry is currently known either that can be employed to generate, simultaneously and in a single acquisition, a plurality of dissociation mass spectra without primary mass selection and without limitation of the range of primary mass, wherein the step of dissociation of the multicharged primary ions can be both implemented at high and low kinetic energy dissociation.

SUMMARY OF THE INVENTION

One aim of the invention is therefore to overcome the drawbacks of the state of the art as presented above, in the case of multicharged primary ions.

In particular, one aim of the invention is to propose a method of mass spectrometry without primary mass selection, compatible with known mass spectrometers, that is capable of simultaneously producing, in a single acquisition, dissociation spectra for a plurality of different primary masses present in a sample to be analysed, for multicharged primary ions, the parent primary ions being dissociated at low or high kinetic energy.

To this end, the invention provides according to a first aspect a method of tandem mass spectrometry for use in a mass spectrometer having a known characteristic function of the mass-to-charge ratio of the ions to be analysed, characterized in that it comprises the following steps:

(a) providing a primary ions source to be analysed, (b) generating a primary mass spectrum of the primary ions, without dissociation, wherein said spectrum contains primary ion peaks of occurrence, (c) from the characteristic function values at the maxima of at least some of said primary mass peaks and from the charge values associated to said peaks, determining correlation laws that all possible multiplets of characteristic function values corresponding to multiplets of charged fragments resulting from the dissociation of parent primary ions of interest corresponding to said primary mass peaks have to meet, (d) concurrently dissociating primary ions of interest associated to primary mass peaks, in order to obtain multiplets of charged fragments from each of said parent primary ions, (e) generating characteristic function values for the dissociated fragments, (f) forming every potential multiplet of said characteristic function values, (g) identifying, from amongst said potential multiplets, the multiplets which meet a proximity criterion in relation to said correlation laws, in order to determine the real multiplets of charged fragments corresponding to the parent primary ions, (h) generating dissociation mass spectra corresponding respectively to the parent primary ions of interest, comprising the peaks associated to the real multiplets of identified fragments.

Some preferred but non-limiting aspects of this method are the following:

the dissociation of a primary ion of interest may generate neutral fragments having a known mass, and wherein the step of determining said correlation laws takes into account such potential loss of mass, the step of determining said correlation laws is performed before the step of generating the characteristic function values for the dissociated fragments.

the step of determining said correlation laws is performed subsequently to the step of generating the characteristic function values for the dissociated fragments, the characteristic function of the charged dissociated fragments depends on the mass-to-charge ratio of the dissociated fragments and is independent from the mass-to-charge ratio of the parent primary ions, the characteristic function of the charged dissociated fragments is proportional to the mass-to-charge ratio of the dissociated fragments, the correlation laws are determined by calculation, the characteristic function of the charged dissociated fragments depends on the mass-to-charge ratio of the dissociated fragment and on the mass-to-charge ratio of the parent primary ions, the correlation laws are determined by use of calibration data obtained with ions of known mass and charge, the step of determining said correlation laws includes the following substeps:

(d1) generating a primary mass spectrum for ions of known mass and charge, (d2) selecting a primary mass peak in said spectrum, (d3) dissociating selected primary ions in order to obtain a given mass-to-charge ratio (M/Q), (d4) generating a dissociation mass spectrum of the dissociated fragments coming from the selected primary ions, (d5) identifying, in the dissociation mass spectrum, the multiplets of peaks corresponding to the events for dissociation into multiplets of charged fragments, (d6) determining the characteristic function values corresponding to the maximum of occurrences ($F_{max}$(m/q)) of each peak belonging to each multiplet identified, (d7) determining, for each possible charge multiplet, each of the correlation laws with the identified multiplets of characteristic function values that satisfy this charge multiplet, and that correspond to the mass-to-charge ratio (M/Q), to the primary charge Q, and to the characteristic function values at maxima of occurrences ($F_{max}$(M/Q)) for the selected primary mass peak, and (d8) repeating steps (d1) to (d7) for each selected primary mass peak of the primary mass spectrum of the known molecules, the method further comprises a step of determining correlation laws of primary mass peaks for unknown molecules on the basis of the correlation laws obtained with the known molecules, the determined correlation laws are defined by sets of coordinates, the determined correlation laws are defined analytically, the method further comprises a step of selecting a group of different primary ions of interest by primary mass selection, the step of selection of the primary ions of interest is implemented before the step of generating the characteristic function values for the dissociated fragments, the proximity criterion is adjustable, steps (e) to (g) are performed for accumulated occurrences of potential multiplets of values, and wherein the characteristic function values as determined in step (e) are those at the maxima of peaks formed by said accumulated occurrences, steps (e) to (g) are performed for multiplets resulting from individual dissociation events, and wherein step (h) is performed by accumulating occurrences of the real multiplets identified, the values of said characteristic function are time-of-flight related, the dissociated ions are contained in successive periodic ion pulses, the pulsation period is shorter than the longest time of flight of the dissociated charged fragments to be measured, wherein steps (d) and (e) are performed with an overlap between consecutive pulses, and wherein step (c) includes determining correlation laws for all possible multiplets of characteristic function values corresponding to multiplets of charged fragments resulting from the dissociation of parent primary ions of interest contained in preceding ion pulses.

According to a second aspect, the present invention provides a tandem mass spectrometer, comprising in combination:

(a) a source (1) of multicharged primary ions to be analysed, (b) a device (3) for generating a primary mass spectrum of the primary ions, without dissociation, where said spectrum contains primary ion peaks of occurrence, (c) a set of correlation laws determined from the characteristic function values at the maxima of at least some of said primary mass peaks and from the charge values associated to said peaks, and that all possible multiplets of characteristic function values corresponding to multiplets of charged fragments resulting from the dissociation of parent primary ions of interest corresponding to said primary mass peaks have to meet, (d) a dissociation device (2) adapted to dissociate primary ions of interest associated to primary mass peaks, in order to obtain multiplets of charged fragments from each of said parent primary ions, (e) a device for generating and storing characteristic function values for the dissociated fragments, (f) a processing device for forming every potential multiplet of said characteristic function values, for identifying, from amongst said potential multiplets, the multiplets which meet a proximity criterion in relation to said correlation laws, in order to determine the real multiplets of charged fragments corresponding to the parent primary ions, and for generating dissociation mass spectra corresponding respectively to the parent primary ions of interest, comprising the peaks associated to the real multiplets of identified fragments.

Some preferred but non-limiting aspects of this tandem mass spectrometer are the following:

the spectrometer further comprises a primary mass selection device for selecting a group of different primary ions of interest, said primary mass selection device comprises an ion trap, said primary mass selection device comprises a quadrupolar, said primary mass selection device comprises a temporal gate, said dissociation device is a multipolar wave guide, the spectrometer comprises a time-of-flight mass spectrometer, the dissociation device is positioned before an ion accelerator to inject ion packets into the time-of-flight space of the time-of-flight spectrometer, the dissociation device is positioned after an ion accelerator to inject ion packets into the time-of-flight space of the time-of-flight spectrometer, said ion accelerator comprises an orthogonal injection device, the spectrometer further comprises a reflectron, the multicharged ion source (1) is an electro-spray ionisation ion source.

According to a third aspect, the present invention provides a computer program designed to be implemented in a mass spectrometry system comprising a mass spectrometer having a known characteristic function of the mass-to-charge ratio of ions, including a set of instructions adapted to perform the following steps:

(a) controlling the system so that it generates, from a source of multicharged primary ions to be analysed, a primary mass spectrum of said primary ions, without dissociation, where this spectrum contains peaks of occurrences of primary ions, (b) performing an acquisition of the data of this spectrum, including characteristic function values at the maxima of at least some of the primary mass peaks and from the charge values associated to said peaks, (c) from said data, determining correlation laws that all possible multiplets of characteristic function values corresponding to multiplets of charged fragments resulting from the dissociation of parent primary ions of interest corresponding to said primary mass peaks have to meet, (d) controlling the system so that it generates the concurrent dissociation of primary ions of interest associated to primary mass peaks so as to obtain multiplets of charged fragments from each of said parent primary ions, and to generate characteristic function values for said dissociated fragments, (e) forming every potential multiplet of said characteristic function value, (f) identifying, from amongst said potential multiplets, the multiplets which meet a proximity criterion in relation to said correlation laws, in order to determine the real multiplets of charged fragments corresponding to the parent primary ions, and (g) generating dissociation mass spectra corresponding respectively to the parent primary ions of interest, comprising the peaks associated to the real multiplets of identified fragments.

Some preferred but non-limiting aspects of this computer program are the following:

steps (e) to (f) are performed for accumulated occurrences of potential multiplets of values, and wherein the characteristic function values as determined in step (d) are those at maxima of the peaks formed by said accumulated occurrences, steps (e) to (f) are performed for multiplets resulting from individual dissociation events, and wherein step (g) is performed by accumulating occurrences of the real multiplets identified.

BRIEF DESCRIPTION OF THE FIGURES

Other aspects, aims and advantages of the invention will more clearly appear on reading the following description of the invention, which is provided by way of a non-limiting example and with reference to the appended drawings in which.

DESCRIPTION OF PREFERRED EMBODIMENTS OF THE INVENTION

First of all, It is recalled that what is meant by a "multicharged ion" is an ion that has a positive or negative electric charge whose absolute value is equal to or greater than 2 and which, when dissociated, can generate a multiplet of charged fragments with a positive or negative electric charge of absolute value that is equal to or greater than 1.

Figure 1:
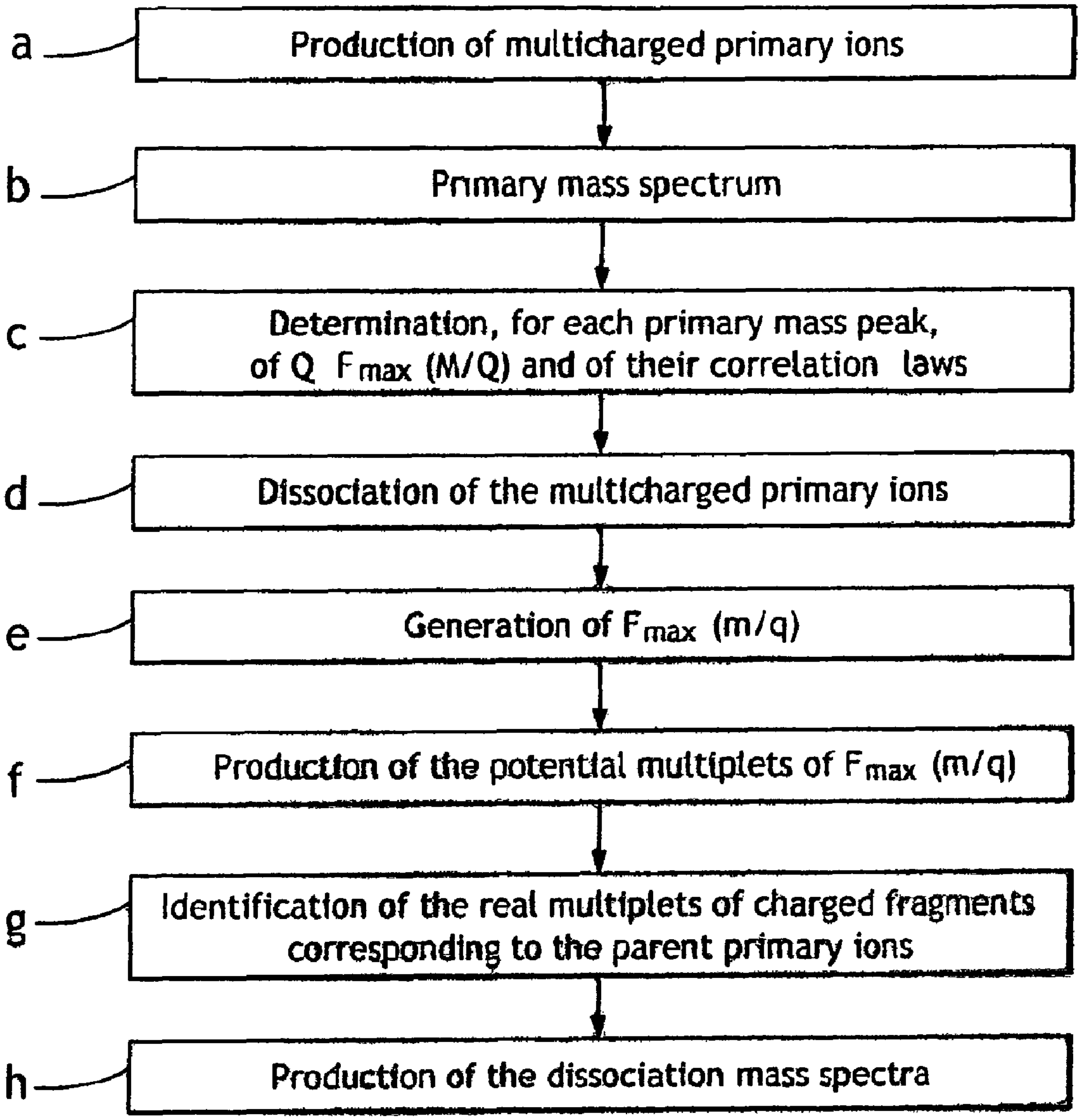
FIG. 1 is a flow chart for a preferred method of implementation of the spectrometry method of the invention.

Referring to FIG. 1 in particular, the method of the invention preferably aims at dissociation of the multicharged primary ions into multiplets of fragments, comprising pairs of charged fragments, triplets of charged fragments, or triplets of fragments composed of a pair of charged fragments and a neutral fragment having a known mass. Nevertheless, more generally, it is possible to implement the present invention with any dissociation channel which generates, in addition to the pairs of charged fragments and triplets of fragments comprising a pair of charged fragment and a neutral fragment having a known mass, multiplets of charged fragments comprising at least three fragments and multiplets of fragments comprising a multiplet of charged fragments having at least three charged fragments and a neutral fragment having a known mass.

In the present method of implementation, implemented with whichever mass spectrometer having a known characteristic function of the mass-to-charge ratio for the ions to be analysed, the first step comprises supplying a primary mass spectrum for multicharged ions obtained from molecules that are to be identified or studied.

This primary mass spectrum can be obtained by reading it from a database, such as a third-party database, in which it will have been saved previously.

It can also be obtained by implementing steps (a) and (b) illustrated in FIG. 1.

At step (a), the molecules to be identified are ionized in a source 1 of multicharged ions, and accelerated with a substantially constant electric field, in order to provide a primary ion source.

And then at step (b), the primary ions are injected into the mass spectrometer 3, in order to generate a primary mass spectrum of said primary ions, without dissociation, wherein said spectrum contains primary ions peaks of occurrence obtained following the measurement of the characteristic function values.

According to the presentation graph conventionally used by the person skilled in the art (though in no way limiting) of mass spectrometry, the primary mass spectrum is generally shown with two perpendicular axes, with the characteristic function values on the abscissa axis, and the corresponding occurrences on the ordinate axis.

This primary mass spectrum is then used to determine, in step (c), the characteristic function values at maxima of occurrences $F_{max}(M/Q)$ of the primary mass peaks, the primary mass-to-charge ratio M/Q and the primary electric charge Q of the ions, for each primary mass peak.

The skilled person will be able to determine the values of each primary mass-to-charge ratio M/Q of the primary ions corresponding to each primary mass peak, by performing the usual prior primary calibration of the mass spectrometer used, with known molecules.

He will also be able to determine the charge Q of the multicharged primary ions corresponding to each primary mass peak with the identification techniques normally employed in mass spectrometry.

Figure 3:
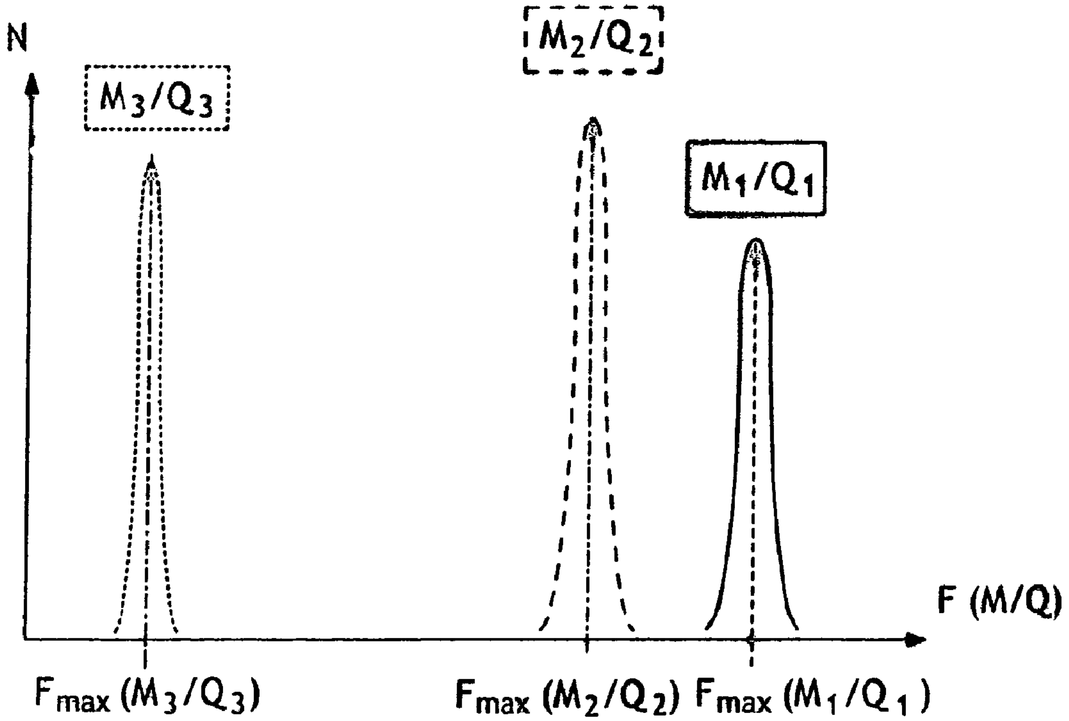
FIG. 3 illustrates a primary mass spectrum of molecules to be identified, comprising three primary mass peaks.

FIG. 3 shows an example of a primary mass spectrum containing three primary mass peaks of primary ions, having the mass-to-charge ratio of $M_1/Q_1$, $M_2/Q_2$ and $M_3/Q_3$ respectively, and the characteristic function values $F_{max}(M/Q)$ at maxima of occurrences for each of said primary mass peaks.

From the characteristic function values and the charge values associated to said peaks, correlation laws, giving every possible multiplet of characteristic function values corresponding to multiplets of charged fragments liable to come from the dissociation of primary ions associated to said primary mass peaks, are determined.

For multicharged primary ions dissociating into pairs of fragments, only one dissociation channel is detectable by implementing the method of the invention, which is the dissociation of the primary ions into pairs of charged fragments.

The relation between the primary mass M and the possible mass pairs $m_i$,$m_j$ of the charged fragments is:

$$M=m_i+m_j.$$

And the relation between the primary charge Q and the possible charge pairs $q_{i'}$,$q_{j'}$ of the charged fragments is:

$$Q=q_{i'}+q_{j'}.$$

The number of correlation laws per primary mass peak is equal to the number of possibilities of distribution of the primary electric charge Q of the primary ions between the pairs of dissociated charged fragments.

For example, for $Q_1$=2e, there exists only one possibility of possible distribution of charges between the pairs of charged fragments, namely:

$$q_{i'}=e,\ q_{j'}=e,$$

and therefore one single corresponding correlation law giving all the possible mass pairs $m_i$, $m_j$ of charged fragments.

For $Q_2$=3e, there are two possibilities for the distribution of charges between the pairs of charged fragments:

$$q_{i'}=e,\ q_{j'}=2e,\ \text{and}$$

$$q_{i'}=2e,\ q_{j'}=e,$$

and therefore two corresponding correlation laws.

For $Q_3$=4e, there are three possibilities for the distribution of charges between the pairs of charged fragments $$q_{i'}=e,\ q_{j'}=3e,$$

$$q_{i'}=3e,\ q_{j'}=e,\ \text{and}$$

$$q_{i'}=2e,\ q_{j'}=2e,$$

and therefore three corresponding correlation laws. And so on.

In the case of low kinetic energy dissociation (cf. supra), the characteristic function of the dissociated charged fragments depends on the mass-to-charge ratio of the dissociated fragments but in independent from the mass-to-charge ratio of the parent primary ions, and is proportional to the mass-to-charge ratio of the dissociated fragments.

Therefore, each correlation law corresponding to each pair of charges $q_{i'}$, $q_{j'}$ of each of the primary mass peak associated to primary ions having the same mass-to-charge ratio M/Q, dissociating into pairs of charged fragments, can always be described analytically by the equation:

$$F_{max}\left(\frac{m_i}{q_{i'}}\right)=F_{max}\left(\frac{M}{q_{i'}}\right)-\frac{q_{j'}}{q_{i'}}\times F_{max}\left(\frac{m_j}{q_{j'}}\right) \tag{1}$$

where $$F_{max}\left(\frac{M}{q_{i'}}\right)=\frac{Q}{q_{i'}}\times F_{max}\left(\frac{M}{Q}\right) \tag{2}$$

Each correlation law corresponding to a primary mass peak of the primary mass spectrum can thus be determined by the method of the invention, on the basis of the primary charge value and of the characteristic function value at maxima of occurrences of said primary mass peak:

- the determination of the primary charge Q allows the determination of every multiplets of possible charges $q_{i'}$, $q_{j'}$, and
- the determination of the characteristic function values at maxima of occurrences allows the determination of each $F(M/q_{i'})$ value of each correlation law, by use of equation (2).

For multicharged primary ions dissociating into triplets of fragments, two dissociation channels are detectable by implementing the method of the invention, which are the dissociation of the primary ions into a triplet of charged fragments, or into a triplet of charged fragment comprising a pair of charged fragments and a neutral fragment having known mass.

For the dissociation channel that produces dissociated pairs of charged fragments coming from a triplet of fragments further comprising a neutral fragment, the corresponding correlation laws can only be determined if the mass of the neutral fragment is known.

The relation between the primary mass M and the possible mass triplets ($m_i$, $m_j$, $\Delta M$) of the charged fragments ($m_i$,$m_j$) and the neutral fragment ($\Delta M$) is:

$$M=m_i+m_j+\Delta M.$$

And the relation between the primary charge Q and the possible charge pairs ($q_{i'}$,$q_{j'}$) of the charged fragments is:

$$Q=q_{i'}+q_{j'}.$$

The number of correlation laws per primary mass peak for each possible mass of the neutral fragment is then equal to the number of possible dissociation channels into pairs of charged fragment for the same primary charge Q.

Most of the various possible masses of the neutral fragment generated through this dissociation channel are actually known by a skilled person. For example, when the molecules to be identified are peptides, the neutral fragments are usually $H_2O$, CO or $NH_3$ molecules. Other possible molecules can be determined, in particular from databases, or are known by the skilled person.

Thus, if $\Delta M$ is denoted as the possible known mass of the neutral fragment, correlation laws of the dissociation channels into triplets of fragments, comprising a pair of charged fragments and a neutral fragment of known mass corresponding to each possible value $\Delta M$, are determined thanks to the previous correlation laws (1) and (2), obtained for dissociation channels into pairs of charged fragments for primary ions having a mass M and a charge Q, by substituting ($M-\Delta M$) to M.

$$F_{max}\left(\frac{m_i}{q_{i'}}\right)=F_{max}\left(\frac{M-\Delta M}{q_{i'}}\right)-\frac{q_{j'}}{q_{i'}}\times F_{max}\left(\frac{m_j}{q_{j'}}\right) \quad (3)$$

where $$F_{max}\left(\frac{M-\Delta M}{q_{i'}}\right)=\frac{Q}{q_{i'}}\times F_{max}\left(\frac{M-\Delta M}{Q}\right) \quad (4)$$

In the case of multicharged ions having a mass M and a primary charge Q which dissociate into a triplet of charged fragments of respective mass-to-charge ratio $\{(m_i/q_{i'}), (m_j/q_{j'}), (m_k/q_{k'})\}$, the relation between the primary mass M and the possible mass triplet $m_i$ $m_j$, $m_k$ of the charged fragments is $$m_i+m_j+m_k=M.$$

And the relation between the primary charge Q and the possible charge triplets ($q_{i'}$, $q_{j'}$, $q_{k'}$) of the charged fragments is:

$$q_{i'}+q_{j'}+q_{k'}=Q.$$

As in the case of dissociation into pairs of charged fragment, the number of correlation laws per primary mass peak for each possible mass of the neutral fragment is equal to the number of possible dissociation channels into triplets of charged fragment for the same primary charge Q.

In the example of multicharged parent primary ions having a charge Q=3e, it has been seen there was only one possible charge distribution between the dissociated charged fragments of the triplet, i.e.:

$$q_{i'}=q_{j'}=q_{k'}=e$$

and, as a consequence, only one corresponding correlation law.

Of course, this reasoning is applicable to any multiplet of charged fragments, having a primary charge superior or equal to 4e.

In the case of low kinetic energy dissociation, each correlation law corresponding to each possible charge distribution of the three dissociated charged fragments $q_{i'}$, $q_{j'}$, $q_{k'}$ can be determined, as in the case of the pairs of charged fragments, thanks to the linear equation:

$$F_{max}\left(\frac{m_i}{q_{i'}}\right)=F_{max}\left(\frac{M}{q_{i'}}\right)-\left(\frac{q_{j'}}{q_{i'}}\right)\times F_{max}\left(\frac{m_j}{q_{j'}}\right)-\frac{q_{k'}}{q_{j'}}\times F_{max}\left(\frac{m_k}{q_{k'}}\right) \quad (5)$$

where $$F_{max}\left(\frac{M}{q_{i'}}\right)=\frac{Q}{q_{i'}}\times F_{max}\left(\frac{M}{Q}\right). \quad (6)$$

Of course, this reasoning is applicable to any multiplets of fragments comprising at least three charged fragments, or at least three charged fragments and a neutral fragment having a known mass. However, this will not be described in detail as the skilled person is capable of such generalization, using the previous examples.

Now back to the execution of the method of the invention, in step (d), multicharged primary ions are dissociated by a dissociation device 2 so as to obtain a multiplet of charged fragments for each of them.

In step (e), the dissociated charged fragments are injected into the mass spectrometer 3, and characteristic function values for the occurrences (or ions current intensity) are measured for the dissociated charged fragments detected by an ion detector 4.

A dissociation mass spectrum (MS-MS) is then generated, on the basis of said values, without primary mass selection, comprising all the mass dissociation peaks of each of the dissociation spectra of the parent primary ions of the primary mass spectrum.

The mass dissociation peaks of the several mass dissociation spectra corresponding to the primary mass peaks of the primary mass spectrum are consequently mixed in the mass dissociation spectrum generated without primary mass selection.

According to the conventional graph presentation for the professionals in this field, although not limiting, each dissociation mass spectrum is generally shown with two perpendicular axes, with the identified characteristic function values on the abscissa axis, and the corresponding occurrences on the ordinate axis.

Figure 4:
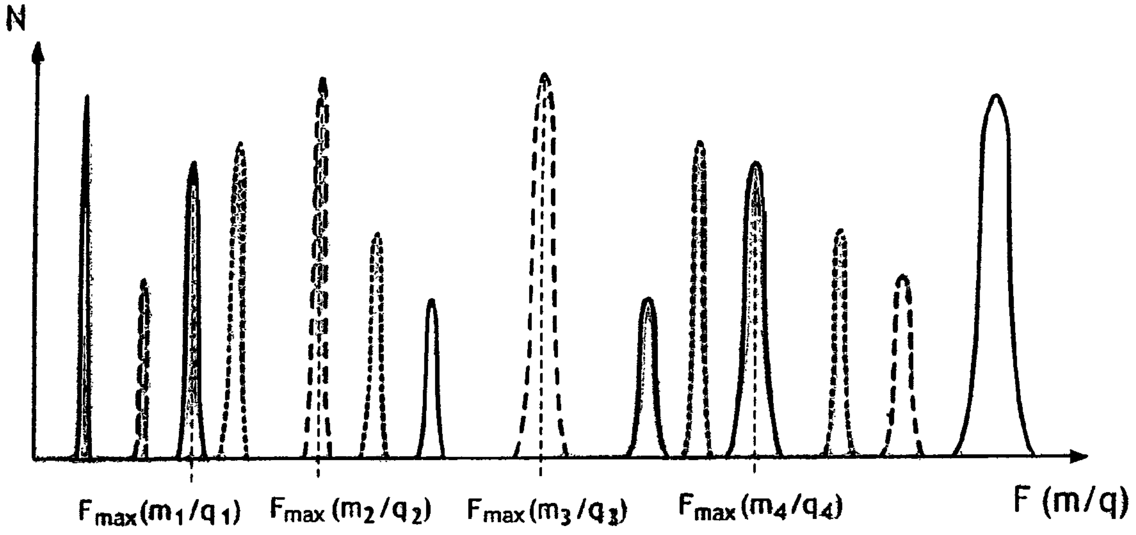
FIG. 4 illustrates a mass dissociation spectrum obtained without primary mass selection, comprising the dissociation mass peaks of the three dissociation spectra corresponding to the three primary mass peaks of FIG. 3, wherein some of the characteristic function values of the charged fragments at maxima of occurrences of each of the dissociation mass peaks are represented.

FIG. 4 illustrates a mass dissociation spectrum (MS-MS) containing the dissociation peaks, corresponding only to the dissociation channel into pairs of charged fragments of the three primary mass peaks of FIG. 3.

In reality, it will be noted that the dissociation of the primary ions further generates:

- charged fragments generated by other possible dissociation channels of interest, which can be identified by the method of the invention (such as, for example, dissociations into triplets of charged fragments and into triplets of charged fragment comprising a pair of charged fragment and a neutral fragment having a known mass), and dissociation peaks which cannot be identified by the method of the invention (such as, for example, dissociation peaks corresponding to the dissociations into pairs of neutral and charged fragments).

The dissociation mass spectrum will thus contain, in addition to the identifiable dissociation mass peaks, mass dissociation peaks corresponding to other possible dissociation channels that are not identifiable, together with the primary mass peaks of the primary ions peaks which have not been dissociated. Nevertheless, the dissociation peaks other than the dissociation peaks identifiable and of interest, and the non-dissociated primary mass peaks can be eliminated from the final dissociation spectra generated by the method of the invention.

Then the characteristic function values at the maxima $F_{max}(m/q)$ of each of the dissociation peaks of the mass dissociation spectrum are determined on the basis of the characteristic function values generated for the occurrences.

Referring to the example of FIG. 4, the dissociation spectrum comprises fourteen mass dissociation peaks corresponding to seven pairs of dissociation peaks, each pair of dissociation peak being associated to pairs of charged fragments coming from the dissociation of identical primary ions having the same mass-to-charge ratio M/Q. Four out of the fourteen characteristic function values at maxima $F_{max}(m/q)$ for the dissociated charged fragments are represented.

In step (f), from the measured characteristic function values at maxima $F_{max}(m/q)$ for the dissociated charged fragments, every potential multiplet of said characteristic function values are formed.

In step (g), from amongst said potential multiplets of values, the real multiplets of characteristic function values, corresponding to real multiplets of dissociation peaks associated to multiplets of dissociated charged fragments (coming from the dissociation of identical primary ions having the same mass-to-charge ratio M/Q for each of the primary mass peaks), are identified, by comparing the potential multiplets of values with the possible multiplets of values determined by the correlation laws of each of the primary mass peaks.

According to the invention, this identification step (g) consists in selecting, from amongst the potential multiplets of characteristic function values at maxima $F_{max}(m/q)$ of occurrences, the multiplets which meet a proximity criterion in relation to possible multiplets of values, said multiplets being provided by the correlation laws of each of the primary mass peaks of the primary mass spectrum.

The proximity criterion precision is at least substantially equal to the precision of the characteristic function values at maxima $F_{max}(M/Q)$ for the primary ions, which determines the precision of the corresponding characteristic laws, and of about the precision of the characteristic function values measurements at maxima $F_{max}(m/q)$ for the dissociated charged fragments, which determines the precision of the potential and real multiplets values.

The precision of the characteristic function values at maxima of the primary ions $F_{max}(M/Q)$ and of the charges fragment $F_{max}(m/q)$ essentially depends on the resolution of the corresponding mass peaks.

Finally, in step (h), each mass dissociation spectrum, corresponding respectively to each of the parent primary ions and comprising the peaks associated to the real multiplets of identified fragments, is generated.

As indicated above, according to a preferred method of implementation of the invention, from step (d) the method is implemented for all of the primary ions to be analysed, without primary mass selection.

According to the graphical representation conventionally used by the person skilled in the art, each mass dissociation peak is generally represented with two perpendicular axes, with the measured characteristic function values in abscissa axis, and the corresponding occurrences in ordinate axis.

Figure 5:
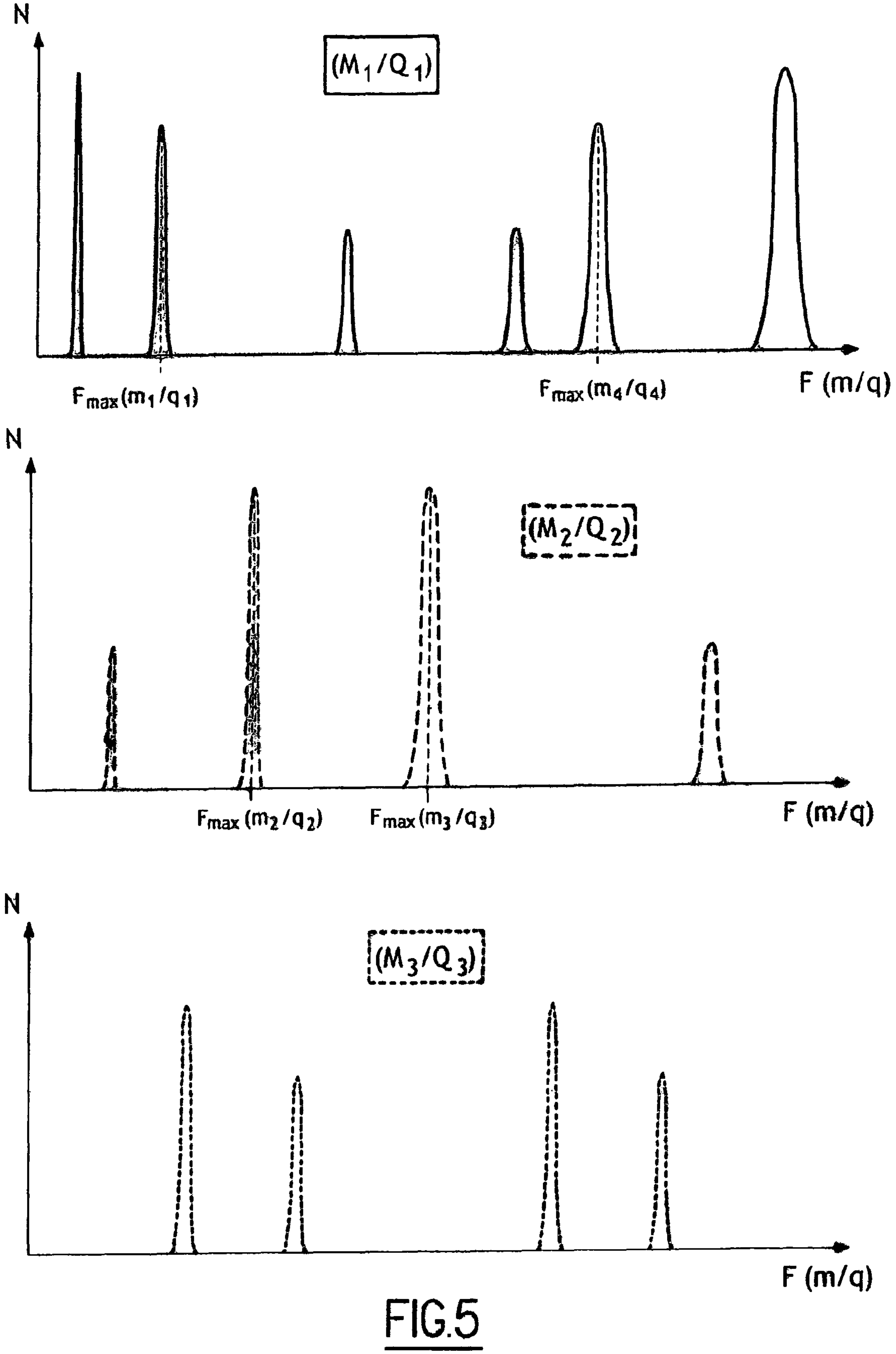
FIG. 5 illustrates the three dissociation spectra of the mass dissociation spectrum of FIG. 4.

FIG. 5 illustrates, by way of a non-limiting example, the three mass dissociation spectra of the three primary mass peaks of FIG. 3, obtained thanks to the mass dissociation spectrum without primary mass selection of FIG. 4.

In order to explain the step (g) mentioned above, a preferred method of implementation will now be described by reasoning through a graphical representation, in the case of the dissociation channels at low kinetic energy into pairs of charged fragments.

The skilled person will understand however, that this is only one type of representation from amongst many others, above all intended to illustrate the principles of this step and to understand the way in which digital processing according to the invention is effected.

Step (g) of the method comprises the following sub-steps:

Initially each real pair of characteristic function values resulting from each primary ion dissociated into a pair of charged fragments is identified from amongst all of the potential pairs of characteristic function values measured, beginning with the generation of a bidimensional spectrum.

This spectrum has two identical first dimensions, each representing the measurements of the characteristic function at maxima of occurrences of the mass dissociation peaks of the detected fragments.

Graphically, the two dimensions correspond to two axes which are preferably perpendicular to each other.

In the plane $\{F_{max}(m_r/q_{r'}), F_{max}(m_s/q_{s'})\}$ of the bidimensional spectrum, each correlation law is represented by a correlation line whose position and form in the plane is determined by said correlation law determined in the preceding step (c):

$$F_{max}\left(\frac{m_i}{q_{i'}}\right) = F_{max}\left(\frac{M}{q_{i'}}\right) - \frac{q_{j'}}{q_{i'}} \times F_{max}\left(\frac{m_j}{q_{j'}}\right)$$

where $$F_{max}\left(\frac{M}{q_{i'}}\right) = \frac{Q}{q_{i'}} \times F_{max}\left(\frac{M}{Q}\right)$$

For a multicharged ion having a charge of 2e, dissociating into a pair of charged fragment, the correlation law is represented by a straight line in the plane $\{F_{max}(m_r/q_{r'}), F_{max}(m_s/q_{s'})\}$ of the bidimensional spectrum.

It is then possible to draw each correlation straight line with the values of each time-of-flight pair $\{F_{max}(M/q_{i'}), F_{max}(M/q_{j'})\}$ in the plane $\{F_{max}(m_r/q_{r'}), F_{max}(m_s/q_{s'})\}$.

Each pair $\{F_{max}(M/q_{i'}), F_{max}(M/q_{j'})\}$ is defined by two positions on each of the two axes of the plane $\{F_{max}(m_r/q_{r'}), F_{max}(m_s/q_{s'})\}$ namely $F_{max}(M/q_{i'})$ on axis $F_{max}(m_r/q_{r'})$ and $F_{max}(M/q_{j'})$ on axis $F_{max}(m_s/q_{s'})$) of the correlation straight line of the equation:

$$F_{max}\left(\frac{m_i}{q_{i'}}\right) = F_{max}\left(\frac{M}{q_{i'}}\right) - \frac{q_{j'}}{q_{i'}} \times F_{max}\left(\frac{m_j}{q_{j'}}\right)$$

Therefore, each correlation straight line in the plane $\{F_{max}(m_r/q_{r'}), F_{max}(m_s/q_{s'})\}$ of the bidimensional spectrum, corresponding to each correlation law, is simply determined by connecting by a straight line the two points $F_{max}(M/q_{i'})$ and $F_{max}(M/q_{j'})$ located on their respective axes.

Each pair of characteristic function values $\{F_{max}(M/q_{i'}), F_{max}(M/q_{j'})\}$ of each correlation straight line corresponding to each pair of charge $q_{i'}$, $q_{j'}$ can thus be determined with the correlation function value at the maximum of occurrences $F_{max}(M/Q)$ together with the primary charge Q of the corresponding mass peak, from:

$$F_{max}\left(\frac{M}{q_{i'}}\right) = \frac{Q}{q_{i'}} \times F_{max}\left(\frac{M}{Q}\right),$$

$$F_{max}\left(\frac{M}{q_{j'}}\right) = \frac{Q}{q_{j'}} \times F_{max}\left(\frac{M}{Q}\right)$$

Figure 6:
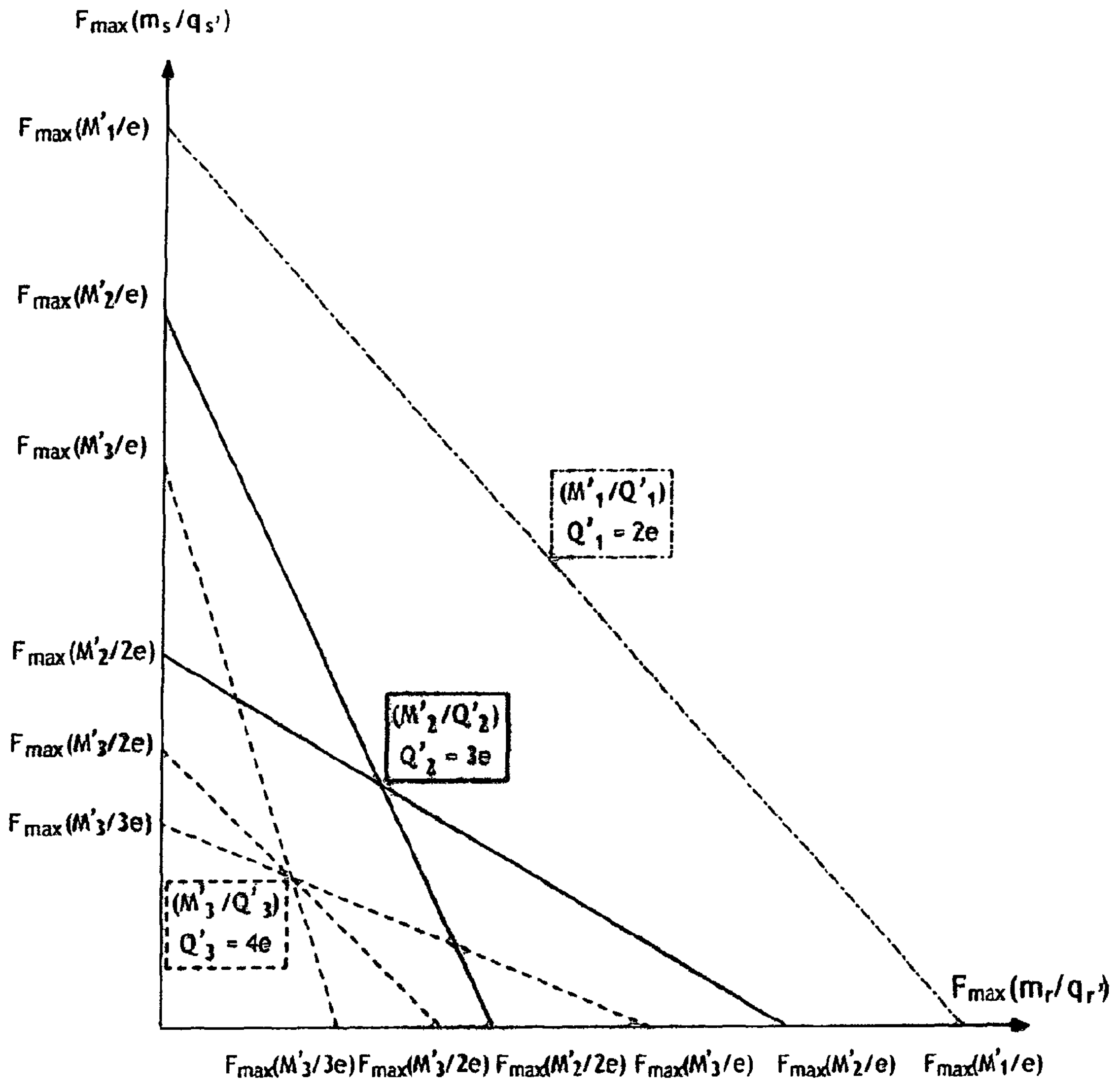
FIG. 6 illustrates, in the plane of a bidimensional spectrum, three examples of characteristic lines of multicharged primary ions dissociating into pairs of charged fragments, corresponding to the correlation laws of the three primary mass peaks of FIG. 3.

FIG. 6 shows, by way of a non-limiting example, the correlation straight lines determined by the correlation laws corresponding to three primary mass peaks of primary charges $Q'_1=2e$, $Q'_2=3e$, and $Q'_3=4e$, in the plane $\{F_{max}(m_r/q_{r'}), F_{max}(m_s/q_{s'})\}$ of the bidimensional spectrum, for multicharged ions dissociating at low kinetic energy.

The equation of the correlation straight line in the plane $\{F_{max}(m_r/q_{r'}), F_{max}(m_s/q_{s'})\}$ of the bidimensional spectrum of FIG. 3 corresponding to the correlation law of the primary mass peak of primary electric charge $Q'_1=2e$ is:

$$F_{max}\left(\frac{m_i}{e}\right) = F_{max}\left(\frac{M'_1}{e}\right) - F_{max}\left(\frac{m_j}{e}\right)$$

The equations of the two correlation straight lines in the plane $\{F_{max}(m_r/q_{r'}), F_{max}(m_s/q_{s'})\}$ of the bidimensional spectrum of FIG. 6 corresponding to the two correlation laws of the primary mass peak of primary electric charge $Q'_2=3e$ are:

$$F_{max}\left(\frac{m_i}{e}\right) = F_{max}\left(\frac{M'_2}{e}\right) - 2 \times F_{max}\left(\frac{m_j}{2e}\right),$$

$$F_{max}\left(\frac{m_i}{2e}\right) = F_{max}\left(\frac{M'_2}{2e}\right) - \frac{1}{2} \times F_{max}\left(\frac{m_j}{e}\right)$$

The equations of the three correlation straight lines in the plane $\{F_{max}(m_r/q_{r'}), F_{max}(m_s/q_{s'})\}$ of the bidimensional spectrum of FIG. 6 corresponding to the three correlation laws of the primary mass peak of primary electric charge $Q'_3=4e$ are:

$$F_{max}\left(\frac{m_i}{e}\right) = F_{max}\left(\frac{M'_3}{e}\right) - 3 \times F_{max}\left(\frac{m_j}{3e}\right),$$

$$F_{max}\left(\frac{m_i}{3e}\right) = F_{max}\left(\frac{M'_3}{3e}\right) - \frac{1}{3} \times F_{max}\left(\frac{m_j}{e}\right),$$

-continued $$F_{max}\left(\frac{m_i}{2e}\right) = F_{max}\left(\frac{M'_3}{2e}\right) - F_{max}\left(\frac{m_j}{2e}\right).$$

Each potential pair $\{F_{max}(m_r/q_{r'}), F_{max}(m_s/q_{s'})\}$ is associated to an occurrence position $P_{rs}$ in the bidimensional spectrum.

To each potential pair $\{F_{max}(m_r/q_{r'}), F_{max}(m_s/q_{s'})\}$ corresponds then a symmetric potential pair $\{F_{max}(m_s/q_{s'}), F_{max}(m_r/q_{r'})\}$. And to two symmetric potential pairs correspond a pair of occurrence positions ($P_{rs}$, $P_{sr}$) in the plane $\{F_{max}(m_r/q_{r'}), F_{max}(m_s/q_{s'})\}$ of the bidimensional spectrum.

Each real pair $\{F_{max}(m_t/q_{t'}), F_{max}(m_u/q_{u'})\}$ is then identified from amongst the potential pairs $\{F_{max}(m_r/q_{r'}), F_{max}(m_s/q_{s'})\}$ by keeping the ones whose corresponding pair of occurrence positions ($P_{tu}$, $P_{ut}$) in the bidimensional spectrum have the propriety of passing to the vicinity of the correlation straight line, at a distance inferior to a given threshold.

It will be seen here that the aforementioned distance threshold criterion is advantageously adjustable.

The precision of said distance threshold is at least of about the precision of the characteristic function values at maxima $F_{max}(M/Q)$ measured for the primary ions, which determines the precision of the corresponding correlation straight lines, and of about the precision of the characteristic function values measured at maxima $F_{max}(m/q)$ for the dissociated charged fragments, which determines the precision of the potential and real occurrences in the bidimensional spectrum.

Figure 7:
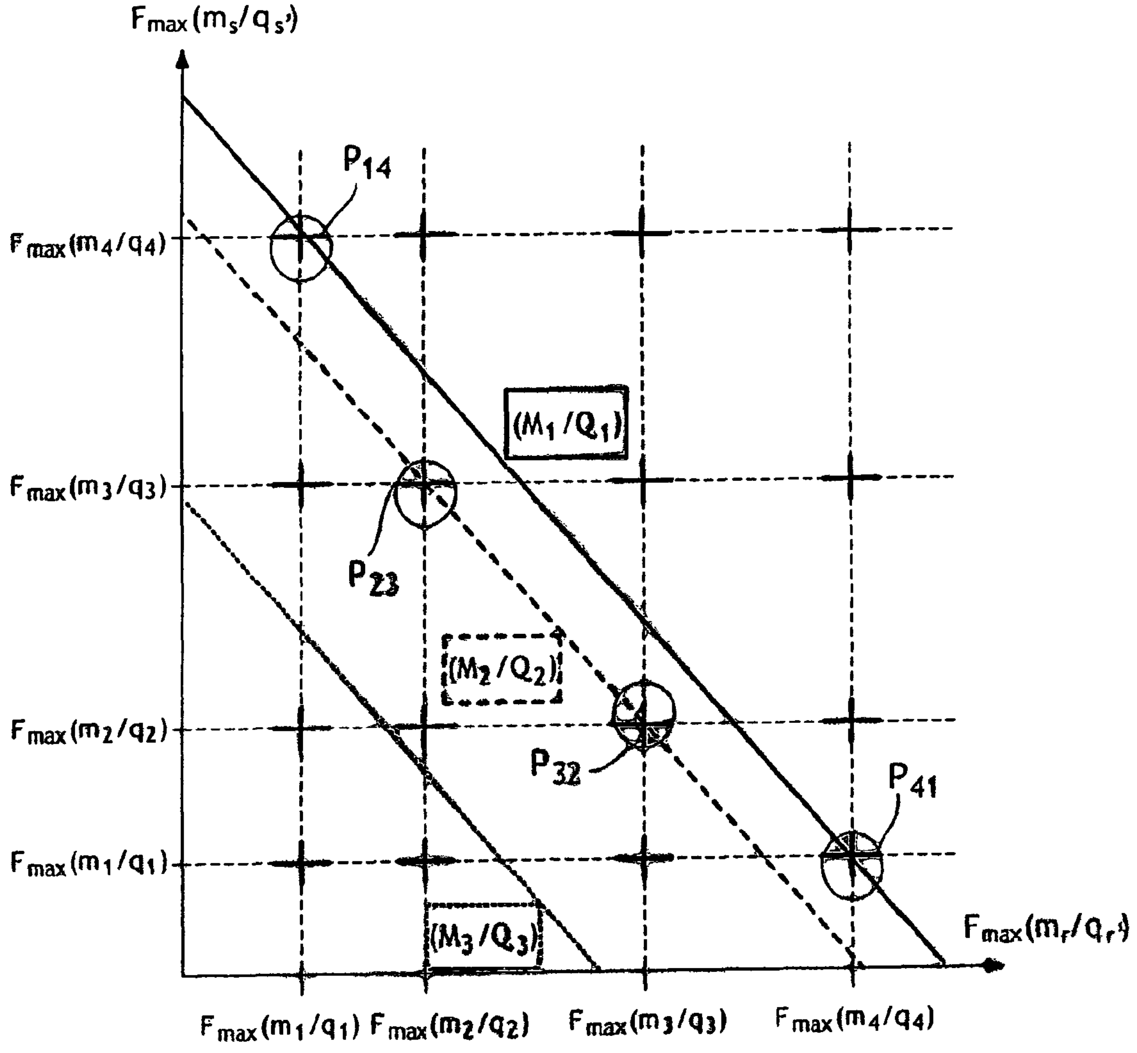
FIG. 7 illustrates the plane of a bidimensional spectrum, wherein three characteristic lines of the primary mass peaks of FIG. 3 corresponding to double charged ions, dissociating without primary mass selection into pairs of charged fragments, are represented, together with the positions of the potential and real pairs of characteristic function values at maxima of occurrences of the dissociation peaks of FIG. 4.

FIG. 7 shows, by way of a non-limiting illustration, the plane $\{F_{max}(m_r/q_{r'}), F_{max}(m_s/q_{s'})\}$ of a bidimensional spectrum, wherein the three correlation straight lines of the primary mass spectrum exemplified in FIG. 3, corresponding to the correlation laws of three primary mass peaks of doubly charged primary ions which dissociate directly into pairs of single-charged fragments having a mass-to-charge ratio respectively equal to $M_1/Q_1$, $M_2/Q_2$ and $M_3/Q_3$, are positioned.

In this illustration, in order to simplify the description, only four values $\{F_{max}(m_1/q_{1'}), F_{max}(m_4/q_{4'})\}$ $\{F_{max}(m_2/q_{2'}), F_{max}(m_3/q_{3'})\}$ corresponding to two real pairs of dissociation peaks from amongst the fourteen ones of FIG. 4, are represented.

These four values $F_{max}(m/q)$ determine sixteen different occurrence positions $P_{rs}$ corresponding to the potential pairs in the plane $\{F_{max}(m_r/q_{r'}), F_{max}(m_s/q_{s'})\}$ of the bidimensional spectrum of FIG. 7, represented by a cross.

If the fourteen values $F_{max}(m/q)$ corresponding to the fourteen dissociation peaks of FIG. 4 were represented on FIG. 7, 196 potential occurrence positions would be determined.

It can be seen that the pair of potential occurrence positions most proximate to the correlation straight line corresponding to primary ions having a mass-to-charge ratio $M_1/Q_1$ is the pair ($P_{14}$, $P_{41}$).

These positions $P_{14}$, $P_{41}$ are indeed located on, or in the immediate vicinity of said correlation line.

The pair $\{F_{max}(m_1/q_{1'}), F_{max}(m_4/q_{4'})\}$ corresponding to the pair of positions ($P_{14}$, $P_{41}$) is therefore identified as being one of a pair of dissociation peak belonging to the dissociation peak of the primary mass peak having the mass-to-charge ratio $M_1/Q_1$ in the example of FIG. 3.

To the contrary, the distance between the other pairs of potential positions and this correlation line is greater than the determined distance threshold, so that it is considered that they do not come from pairs of dissociation peaks of the dissociation spectrum of the primary mass peak having the mass-to-charge ratio of $M_1/Q_1$.

By the way, the pair of potential occurrence positions most proximate to the correlation straight line corresponding to primary ions having a mass-to-charge ratio $M_2/Q_2$ is the pair $(P_{23}, P_{32})$.

The pair $\{F_{max}(m_2/q_{2'}), F_{max}(m_3/q_{3'})\}$ corresponding to the pair of positions $(P_{23}, P_{32})$ is therefore identified as being one of a pair of dissociation peaks belonging to the dissociation spectrum of the primary mass peak having the mass-to-charge ratio $M_2/Q_2$ in the example of FIG. 3.

The distances between the other pairs of potential positions and the correlation lines are too important in relation to the determined distance threshold, so that it is considered that they do not come from the dissociation of any one of the primary ions having a mass-to-charge ratio of $M_1/Q_1$, $M_2/Q_2$ or $M_3/Q_3$.

The two real pairs of occurrence identified $(P_{14}, P_{41})$ and $(P_{23}, P_{32})$ are represented on FIG. 7 by encircled crosses.

In order to simplify the present description, the above example, illustrated on FIGS. 4 and 7, only comprises the dissociation peaks of parent primary ions which dissociate into pairs of charged fragments.

It will be understood that in reality, the dissociation spectrum, obtained without mass selection, contains also mass peaks obtained from the other possible dissociation channels of multicharged primary ions, providing identifiable and non-identifiable dissociation peaks, as well as primary mass peaks of multicharged ions which did not dissociate. These dissociation peaks are not in order to simplify the description.

Nevertheless, the primary mass peaks of the mass dissociation spectrum can actually be eliminated by use of the primary mass spectrum.

In addition, the set of dissociation peaks further generates virtual potential multiplets. Most of them are eliminated by the identification criterion of the real multiplets, but some of them can be accepted and generate false identified multiplets and therefore false multiplets of mass dissociation peaks in the dissociation spectra generated according to the method of the invention.

However, it is possible for the skilled person to eliminate said false mass dissociation peaks thanks to known data bases, by comparing the masses of the false multiplets to the masses of the multiplets of fragments of the theoretical or experimental possible dissociation channels that correspond to the measured mass of the parent ions.

The previous graphical method was described for dissociation channels that generate pairs of charged fragments, but it can obviously be implemented to dissociation channels that generate charged fragments multiplets comprising more than two fragments, such as triplets.

In the case of triplets, by way of a non-limitative example, a three-dimensional spectrum is then used instead of the above bidimensional spectrum. Said three-dimensional spectrum comprises three identical axes, each representing the measured values of the characteristic function of the dissociated charged fragments at maxima of occurrences of the dissociation peaks of the dissociation spectrum, obtained without primary mass selection.

Preferably, the three axes are perpendicular to each other.

The equivalent of each occurrence position $P_{rs}$ corresponding to each potential pair identified $\{F_{max}(m_r/q_{r'}), F_{max}(m_s/q_{s'})\}$ in the previously described bidimensional spectrum is an occurrence position $P_{rsv}$ in the volume of the three-dimensional spectrum, corresponding to each potential $\{F_{max}(m_r/q_{r'}), F_{max}(m_s/q_{s'}), F_{max}(m_v/q_{v'})\}$ triplet identified.

To each correlation law, corresponding to the dissociation channels into triplets of charged fragments, corresponds then a correlation plane in the volume of the three-dimensional spectrum having the equation:

$$F_{max}\left(\frac{m_i}{q_i}\right) = F_{max}\left(\frac{M}{q_{i'}}\right) - \frac{q_{j'}}{q_{i'}} F_{max}\left(\frac{m_j}{q_{j'}}\right) - \frac{q_{k'}}{q_{j'}} F_{max}\left(\frac{m_k}{q_{k'}}\right)$$

where $$F_{max}\left(\frac{M}{q_{i'}}\right) = \frac{Q}{q_{i'\times}} \times F_{max}\left(\frac{M}{Q}\right).$$

Each real triplet corresponding to each position $P_{utw}$ in the three-dimension spectrum is consequently identified, as in the previously described bidimensional case, among the potential triplets of positions thanks to the distance threshold criterion in relation to said correlation space.

The method of the invention is implementable for dissociation channels of multicharged ions into pairs of charged fragments, triplets of charged fragments, triplets of charged fragments comprising a neutral fragment having a known mass, as well as multiplets of charged fragments comprising at least three fragments and multiplets of fragments comprising at least three charged fragments and a neutral fragment having a known mass. Then, if N is denoted as the maximal number of potential multiplets, the correlation laws for such multiplets are spaces having a dimension equal to N−1.

As previously described, the method of the invention allows the concurrent generation, in a single acquisition and without mass selection, of all the mass dissociation spectra corresponding to all the primary mass peaks of the primary mass spectrum.

It is possible that the mass peaks of interest, for which a dissociation mass spectrum is wanted, be only part of the set of primary mass peaks obtained in step (b). In addition, the greater the number of primary mass peaks, the greater the number of dissociation peaks, and therefore the number of false multiplets of identified dissociation peaks.

Figure 8:
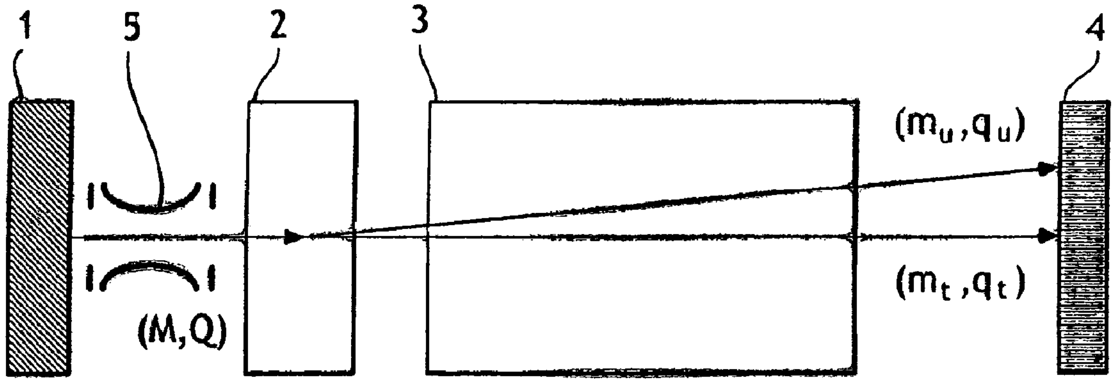
FIG. 8 illustrates a tandem mass spectrometer according to an embodiment of the invention.

It is possible to use a device 5 positioned between the ion source 1 and the dissociation device 2, as illustrated in FIG. 8, to simultaneously select the primary peaks of interest before the injection of the primary ions in the dissociation device 2, and eliminate the others. It is then possible to simultaneously generate the set of dissociation spectra of interest according to the method of the invention, and reduce the number of false multiplets of identified dissociation peaks.

The aforementioned device 5 can be a quadrupolar mass spectrometer, which selects a large mass band comprising simultaneously several primary mass peaks of interest containing the dissociation peaks to be identified of all the selected primary mass peaks. This kind of device 5 allows the reduction of the number of false identified dissociation peaks, but can only select a part of the primary mass peaks of interest at each acquisition, what can require the generation of several dissociation spectra to generate all the dissociation peaks of interest.

By contrast, the use of an ion trap as device 5 allows both selection of the set of primary mass peaks of interest and the reduction of the number of false multiplets of identified dissociation peaks. In this embodiment, the ions generated by the ion source 1 are stored in the ion trap 5 until their ejection out of the trap towards the dissociation device 2 in relation to their mass-to-charge ratio, by applying a variable tension inside the ion trap 5, as known by the skilled person. A device made of, for example, a pair of deflection plates subject to a variable tension and positioned at the exit of the ion trap 5, deviates the ejected primary ions that are of no interest, and lets only the primary ions corresponding to the primary mass peaks of interest pass through.

The invention as described above has been explained using a graphical approach through the use of a two dimensional space with two dimensions (pairs of characteristic function values) containing correlation lines.

However, it will be understood that its concrete implementation is achieved typically by a digital computer such as a DSP (for "Digital Signal Processor") executing the appropriate programs.

In particular, the correlation laws will typically be numerical data (such as, for example in the case of low kinetic energy dissociation, the equations (1), (3), (5), or sets of coordinates) with which the numerical characteristic function data generated by the spectrometers and supplied to the computer will be compared.

More practically, the present invention can be embodied in the form of a software module that is added to an existing mass spectrometry device, and interfaced with the other software of this equipment so as to perform, for the most part, the establishment of the correlation laws data and collection of the characteristic function data in order to compare them with these correlation laws data.

In any event, the professional in this field will understand that production of the primary mass spectrum and of the dissociation spectra obtained from multicharged primary ions dissociating into multiplets of charged fragments, provides the possibility of identifying the molecules studied.

Application of the Method of the Invention to a Tandem Time-of-Flight Mass Spectrometer:

Now will be described a method and system of tandem mass spectrometry for multicharged ions, without primary mass selection and with a time-of-flight spectrometer, according to the invention.

In time-of-flight mass spectrometry, the step of dissociation of the ions can be implemented either at low kinetic energy, as in the above description, or at high kinetic energy. One difference is that, at low kinetic energy, the characteristic function for the charged fragments, here the square time-of-flight, is proportional to the mass-to-charge ratio of the ions to be analysed (the function depends on the mass-to-charge ratio of the charged fragments, but does not depend on the mass-to-charge ratio of the primary ions), whereas at high kinetic energy, it depends on the mass-to-charge ratio of the charged fragments, and on the mass-to-charge ratio of the parent primary ions.

The time-of-flight of the charged fragments dissociated at high kinetic energy of mass-to-charge ratio m/q is therefore generally of the form:

$$TOF_{max}\left(\frac{m}{q}\right) = V\left(\frac{M}{Q}\right) \times H\left\{\left(\frac{m}{M}\right) \times \left(\frac{Q}{q}\right)\right\}$$

where $$V\left(\frac{M}{Q}\right)$$

is the velocity of the parent primary ion of mass-to-charge ratio M/Q before dissociation, and $$H\left\{\left(\frac{m}{M}\right) \times \left(\frac{Q}{q}\right)\right\}$$

is a function which depends on the mass-to-charge ratio m/q of the charged fragment, on the mass ration M/Q of the parent primary ions, and of the time-of-flight mass spectrometer used.

Nevertheless, $$H\left\{\left(\frac{m}{M}\right) \times \left(\frac{Q}{q}\right)\right\}$$

cannot generally be expressed in the form:

$$H^2\left\{\left(\frac{m}{M}\right) \times \left(\frac{Q}{q}\right)\right\} = G' \times \frac{m}{q}$$

where G' would be a function which would not depend on the mass-to-charge ratio m/q of the charged fragments.

By way of consequence, another means is necessary to provide the correlation laws, in order to implement the method of the invention at high kinetic energy too with a time-of-flight mass spectrometer.

Determination of the correlation laws for unknown molecules in the case of dissociation at high kinetic energy with the method of the invention will therefore generally, in this case, necessitate a special prior additional calibration, for each time-of-flight mass spectrometer used, with molecules of known primary mass and dissociation spectra.

Of course, calibration can also be implemented with dissociation at low kinetic energy instead of using the analytical equations detailed in the above description.

This calibration is preferably effected with primary mass selection device (which however is not necessary for implementing the spectrometry method proper, except, as described previously, for the simultaneous selection of the primary peaks of interest), with the following substeps.

In step (d1), a primary mass spectrum of the known molecules is generated.

And then, in step (d2), a primary mass peak in this primary mass spectrum is selected, and the selected primary ions of mass-to-charge ratio M/Q are dissociated.

In step (d3), the selected primary ions with like mass-to-charge ratio M/Q are dissociated.

In step (d4), a dissociation mass spectrum of the dissociated fragments coming from the fragmentation of the selected primary ions is generated.

Step (d5) consists in identifying, in the obtained known dissociation mass spectrum, the multiplets of peaks corresponding to events of dissociation into multiplets of charged fragments, In step (d6) is determined the time-of-flight measurements at maxima $TOF_{max}$(m/q)) of occurrences of each mass dissociation peak belonging to each multiplet of identified mass dissociation peak.

In step (d7) are determined, for each possible charge multiplet, each of the correlation laws with the identified time-of-flight multiplets $TOF_{max}$(m/q) satisfying this charge multiplet, and corresponding to the mass-to-charge ratio M/Q, to the primary charge Q, and to the time-of-flight at maxima of occurrences $TOF_{max}$(M/Q) of the selected primary mass peak.

In step (d8), the preceding steps are repeated for each of the selected primary mass peaks of the primary mass spectrum of the known molecules, Then the correlation laws for primary mass peaks of unknown molecules can be determined on the basis of the correlation laws of the primary mass peaks of known molecules.

Of course, this calibration is implementable with any primary mass spectrometer, by substituting the characteristic function of the mass spectrometer to the time-of-flight in the previous substeps.

It is possible to perform the preceding calibration without primary mass selection, on condition that it is possible to identify the multiplets of dissociation peaks corresponding to each primary mass peak of the primary mass spectrum of the known molecules in the dissociation spectrum obtained where all the dissociation peaks of all the primary mass peaks are mixed.

Returning here to the execution of the method of the invention, in step (d), multicharged primary ions are dissociated in a dissociation device 2 so as to obtain a multiplet of charged fragments for each of them.

In the case of dissociation at low kinetic energy, the primary ions were dissociated before the pulsation and the acceleration of the ion packet toward the time-of-flight space 3 of the mass spectrometer used.

Now, in the case of the dissociation at high kinetic energy, the primary ions are dissociated in the time-of-flight space 3 after acceleration and pulsation of the primary ions.

According to an embodiment of the invention, the step of determination of said correlation laws can be performed before or subsequently to the step of generation of the characteristic function values for the dissociated fragments, here the time-to-flight of the dissociated fragments.

In step (e) are measured the times-of-flight TOF(m/q) of the charged fragments at each ion packet pulse, with at least one ion detector 4.

It will be noted here that according to a preferred aspect, the detector is of the type that can measure only the times-of-flight.

What is meant in particular by this, is that it is not of the type which necessarily measures positions.

It will be seen in fact that the spectrometry method according to the preferred method of the invention advantageously needs only information on the times-of-flight of the fragments, and that it is able to dispense with the position measurements.

It is possible however, in another method of implementation, to use a detector that measures both the times-of-flight and the positions.

Steps (f) to (h) can be performed with time-of-flight mass spectrometers according to the previous description and will thus not be further described.

Nevertheless, in the case of time-of-flight mass spectrometers and without changing the method of the invention, steps (f) to (h) of the method of the invention can also be implemented at each ion packet pulse rather than at the end of the acquisition, in order to produce the dissociation spectrum without primary mass selection by accumulation of a given series of ion packets pulses.

In this implementation of the invention, step (f) consists in forming, after each ion packet pulse, each potential multiplet of the measured times-of-flight of the primary ions.

Then, in step (g), from amongst said potential multiplets, the multiplets which meet a proximity criterion in relation to said correlation laws are identified after each ion packet pulse, in order to determine the real multiplets of charged fragments corresponding to the parent primary ions, Finally, in the step (h), each dissociation mass spectrum corresponding to each of the primary mass peaks with the real time-of-flight multiplets of identified charged fragments is generated by cumulating, after each ion packet pulse, the real identified time-of-flight multiplets of each of the dissociation spectra corresponding to each primary mass peak.

In order to explain steps (f) to (h) mentioned above, its preferred method of implementation will now be described by reasoning through a graphical representation in the case of the dissociation channels into pairs of charged fragments.

The professional in this field will understand however, that this is, again, only one type of representation from amongst many others, above all intended to illustrate the principles of this step and to understand the way in which digital processing according to the invention is effected.

Following the production of all the potential multiplets of time-of-flight measurements for the detected ions in step (f), after each ion packet pulse and from amongst all of the potential time-of-flight pairs measured, each real time-of-flight pair resulting from each primary ion dissociated into a pair of charged fragments is identified in step (g), beginning with the generation of a bidimensional spectrum, of the type previously described.

In the plane $\{TOF_r(m/q), TOF_s(m/q)\}$ of the bidimensional spectrum, each correlation law is represented by a correlation line whose position and form in the plane is determined by the corresponding correlation law determined in the preceding step (c).

Naturally, the two identical axes of the plane of the bidimensional spectrum, instead of directly representing the time-of-flight measurements, can also represent biunivocal functions of the time-of-flight measurements, such as the time-of-flight measurements raised to the square $\{TOF^2_r(m/q), TOF^2_s(m/q)\}$ for example, without this changing the method of the invention.

In the case of dissociation of the primary ions at low kinetic energy, each correlation law:

$$TOF^2\left(\frac{m_i}{q_{i'}}\right) = TOF^2\left(\frac{M}{q_{i'}}\right) - \frac{q_{j'}}{q_{i'}} \times TOF^2\left(\frac{m_{j'}}{q_{j'}}\right)$$

has the equation of a straight line in the plane $\{TOF^2_r(m/q), TOF^2_s(m/q)\}$ of the bidimensional spectrum.

In the case of a dissociation of the primary ions at high kinetic energy, it is possible to implement step (d8) of the calibration by forming each correlation line corresponding to each correlation law in the plane $\{TOF_r(m/q), TOF_s(m/q)\}$ of the bidimensional spectrum with the following substeps illustrated graphically.

On each axis of the plane $\{TOF_r(m/q), TOF_s(m/q)\}$ of the bidimensional spectrum, each time-of-flight $TOF_{max}(m/q)$ at maxima of occurrences for each of the pairs of identified dissociation peaks of known molecules is positioned.

And then, in the plane $\{TOF_r(m/q), TOF_s(m/q)\}$ of the bidimensional spectrum, each occurrence position corresponding to each pair of time-of-flight $\{TOF_{max}(m_1/q_1)\ TOF_{max}(m_2/q_2)\}$ at maxima of occurrences for each of the pairs of identified dissociation peaks is determined.

Finally each correlation line corresponding to each of the pairs $(q_1,q_2)$ of possible charges having the property of passing, in the plane $\{TOF_r(m/q), TOF_s(m/q)\}$ of the bidimensional spectrum, in the general vicinity of the positions of the identified time-of-flight pairs satisfying this charge pair is determined.

Figure 9:
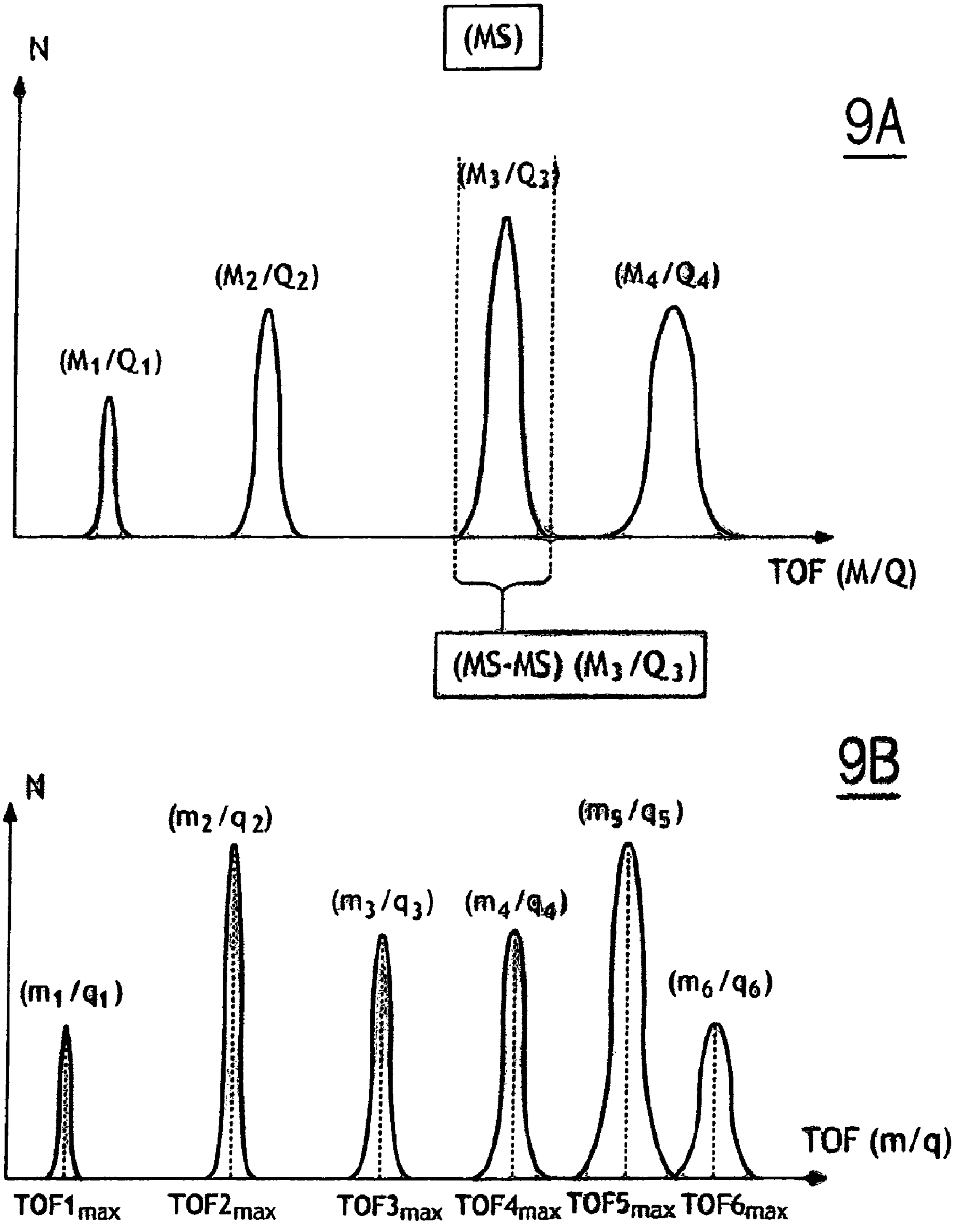
FIGS. 9A and 9B illustrate an example of a primary mass spectrum for known molecules, and a dissociation spectrum generated after selection of the ions according to one of these primary mass peaks, in the application of the method of calibration of the invention to a tandem time-of-flight mass spectrometer implementing high kinetic energy dissociation.

FIG. 9B shows, by way of a non-limiting illustration, a dissociation spectrum (MS-MS) containing only the dissociation peaks corresponding to the channel for dissociation into pairs of charged fragments, that can be obtained after selection of the known primary mass peak whose mass-to-charge ratio is $M_3/Q_3$ in FIG. 9A. The ions of this selected primary mass peak are doubly charged.

It will be understood that in reality, the dissociation spectrum will also contain peaks of mass corresponding to charged fragments obtained from the other possible channels of dissociation (such as for example coming from dissociation events into pairs of neutral and charged fragments, or indeed in three fragments or even more). These dissociation peaks are not in order to simplify the description.

In this example, it is possible to see that the dissociation spectrum includes six dissociation mass peaks corresponding to charged fragments of mass-to-charge ratio $m_1/q_1$, $m_2/q_2$, $m_3/q_3$, $m_4/q_4$, $m_5/q_5$, and $m_6/q_6$, respectively.

It is also possible to see the times-of-flight at maxima of occurrences of these different dissociation peaks.

Figure 10:
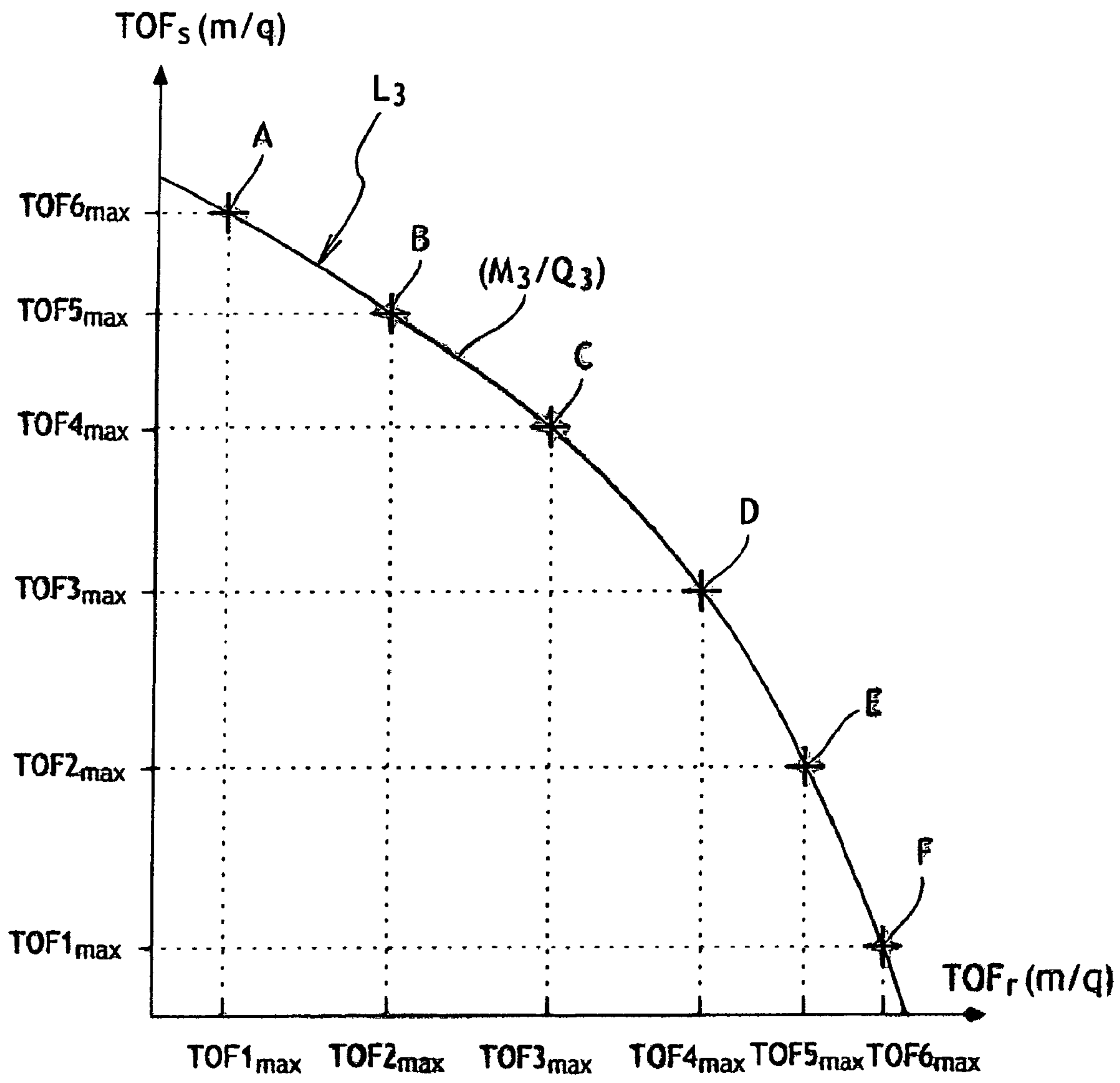
FIG. 10 illustrates a correlation line of doubly-charged known primary ions of selected mass-to-charge ratio, in the plane of a bidimensional spectrum, in the application of the method calibration of the invention to a tandem time-of-flight mass spectrometer using high kinetic energy dissociation.

By way of a non-limiting example, FIG. 10 shows the correlation line $L_3$ obtained graphically by connecting the positions A, B, C, D, E, and F, in the plane $\{TOF_r(m/q), TOF_s(m/q)\}$ of the bidimensional spectrum, of the identified time-of-flight pairs at the maxima of occurrences of these different dissociation peaks.

From amongst all of the potential time-of-flight pairs measured, each real time-of-flight pair resulting from each primary ion dissociated into a pair of charged fragments is determined, in step (g), by associating with each potential pair $\{TOF_r(m/q), TOF_s(m/q)\}$ of time-of-flight measurements at each pulsation of the ion packet generated, a corresponding position $P_{rs}$ in the plane $\{TOF_r(m/q), TOF_s(m/q)\}$ of the bidimensional spectrum.

To each potential pair $\{TOF_r(m/q), TOF_s(m/q)\}$ corresponds a potential symmetrical pair $\{TOF_s(m/q), TOF_r(m/q)\}$.

And to said two potential symmetrical pairs, correspond therefore two different symmetrical positions of occurrence $(P_{rs}, P_{sr})$ in the plane $\{TOF_r(m/q), TOF_s(m/q)\}$ of the bidimensional spectrum.

Likewise, each pair of dissociated charged fragments obtained from the dissociation of a parent primary ion generates two real measured time-of-flight pairs, namely $\{TOF(m_t/q_t), TOF(m_u/q_u)\}$ and its symmetrical pair $\{TOF(m_u/q_u), TOF(m_t/q_t)\}$.

And to said two real symmetrical pairs, there therefore also correspond two different symmetrical positions of occurrence $(P_{tu}, P_{ut})$, in the plane $\{TOF_r(m/q), TOF_s(m/q)\}$ of the bidimensional spectrum.

Each real time-of-flight pair $\{TOF(m_t/q_t), TOF(m_u/q_u)\}$ resulting from a primary ion dissociated into a pair of charged fragments from amongst the potential time-of-flight pairs $\{TOF_r(m/q), TOF_s(m/q)\}$ is determined, by retaining those whose corresponding two occurrence positions $(P_{tu}, P_{ut})$ in the plane $\{TOF_r(m/q), TOF_s(m/q)\}$ of the bidimensional spectrum, are each at a distance from one of the characteristic lines determined at step (c), less than a given threshold.

It will be seen here that the aforementioned distance threshold criterion is advantageously adjustable.

This distance threshold can be chosen to be less than or equal to the resolution of the dissociation peaks, on either side of each correlation line, which allows us to improve the resolution (beyond the resolution of the instrument) at the expense of sensitivity.

If on the other hand this distance threshold is greater than or equal to the resolution of the dissociation peaks, it is possible to identify all the pairs of dissociated detected charged fragments, which maximises the sensitivity to the detriment of the resolution, which is then the instrumental resolution.

In step (h), all of the dissociation mass spectra in the form of tridimensional dissociation mass spectra are simultaneously generated by cumulating, on a third perpendicular axis N in the bidimensional mass spectrum, the occurrence positions $P_{tu}$ of the real time-of-flight pairs of charged fragments identified $\{TOF(m_t/q_t), TOF(m_u/q_u)\}$ in the plane $\{TOF_r(m/q), TOF_s(m/q)\}$ that includes the two axes of the times-of-flight of the measured fragments.

It will be noted here that, in this case, the method of the invention advantageously generates, in a simultaneous manner, all of the dissociation spectra comprising the events of the dissociation channels into pairs of charged fragments in the form of a three-dimensional spectrum.

Naturally, other equivalent three-dimensional mass spectra can be generated by the method of the invention.

For example, another three-dimensional spectrum can correspond to a replacement of the time-of-flight measurements for the two identical axes of the plane $\{TOF_r(m/q), TOF_s(m/q)\}$ by functions of these values (such as, for example, the squared elevation of the times-of-flight $\{TOF^2_r(m/q), TOF^2_s(m/q)\}$).

For each ion packet pulsation, the ion detector 4 detects charged fragments coming from every possible dissociation channel of multicharged primary ions, and provides identifiable and non-identifiable dissociation events, as well as primary ions which did not dissociate.

All of these contributions generate the background noise detected by the ion detector 4 at each pulsation of the ion packet, which is superimposed on the signal of interest coming from the multiplets of charged fragments producing the real multiplets to be identified, in the case of dissociation of the primary ions without primary mass selection.

This background noise therefore also generates additional potential time-of-flight multiplets, most of which is eliminated by the criterion for identification of the multiplets of dissociated charged fragments.

However, a small part of these potential multiplets which are not of interest is accepted by the criterion for identification of charged fragments, after each ion packet pulse, and generates false real multiplets.

According to the graphical example, these false real multiplets correspond graphically to the presence of corresponding positions located in the positive zone of the criterion for value of the distance threshold in relation to the correlation lines in the two dimensional spectrum.

These false identified multiplets are the actual background noise of the dissociation spectra generated by the method of the invention with time-of-flight mass spectrometers in steps (f) to (h), which are implemented at each ion packet pulse.

This actual background noise is very much less than the background noise detected by the ion detector 4 since only a part of the background noise detected generates false identified multiplets.

Now regarding the ion packets pulse, according to a preferred method of implementation of the invention for time-of-flight mass spectrometers, the period of said pulsations is longer than the longest of the times-of-flight $TOF\{(M/Q)_{max}\}$ of the charged fragments or of the primary ions to be measured.

This period determines a frequency, called the normal pulsation frequency of the ions $f=[1/TOF\{(M/Q)_{max}\}$, which is then typically identical for all the steps from (a) to (h) of the method of the invention.

According to another preferred method of implementation of the invention, the period of the pulsations of the ion packet can be chosen to be shorter than the longest of the times-of-flight $TOF\{(M/Q)_{max}\}$ of the charged fragments or of the primary ions to be measured.

This pulsation period thus determines a pulsation frequency, f', which is higher than the normal pulsation frequency f, where $f'=Z\times f$ (or Z is a number greater than 1).

In this case, steps (a) to (c) of the method of the invention are first implemented at the normal pulsation frequency f.

The correlation laws corresponding to the highest pulsation frequency f' are then determined from the correlation laws determined at the normal frequency f in the preceding step (c).

Steps (d) to (g) are then implemented at the highest pulsation frequency f', with, as a consequence, a possible overlap of the detected charged fragments between a series of consecutive pulses.

By reasoning here again with graphical analogy used to describe the digital processing of the invention in the case of dissociation channels into pairs of charged fragments, steps (a) to (c) of the method of the invention are implemented, by positioning all the corresponding correlation lines to all the correlation laws of each primary mass peak in the plane $\{TOF_r(m/q), TOF_s(m/q)\}$ of the possible time-of-flight pairs of the bidimensional spectrum. The length of each axis of this plane is equal to $TOF\{(M/Q)_{max}\}$.

Each correlation line corresponding to each correlation law is therefore represented once in the plane of the bidimensional spectrum.

If one considers an acquisition effected at the normal pulsation frequency f, and having P pulsations of ion packets, the total length of the acquisition will be:

$$T_{tot}=P\times TOF\{(M/Q)_{max}\}.$$

If $T_{tot}$ is segmented into P successive time slices, each of $TOF\{(M/Q)_{max}\}$ in length, it is possible to construct P identical bidimensional spectra, each corresponding to an acquisition at frequency f, with, on the two axes, corresponding consecutive time slices likewise of length $TOF\{(M/Q)_{max}\}$.

It is then possible to position, in each of the P bidimensional spectra, which are all identical, all of the correlation lines determined in steps (a) to (c) of the method of the invention.

Each correlation line corresponding to each correlation law is therefore represented once on each of the P two-dimensional spectra, with the same position in each two-dimensional spectrum.

The correlation lines of the correlation laws corresponding to pulsation frequency f' are then determined by positioning the Z identical correlation lines, corresponding to each correlation law, in each of the P bidimensional spectra, in relation to the position of each correlation line corresponding to the normal pulsation frequency f, in each of the P bidimensional spectra.

If any two consecutive bidimensional spectra from amongst the P spectra are considered, each of the two correlation lines of the same correlation law with the same position in each of the two bidimensional spectra corresponding to pulsation frequency f are temporally spaced by a length equal to $TOF\{(M/Q)_{max}\}$.

A number equal to Z−2 of additional correlation lines of the same correlation law corresponding to pulsation frequency f' are then positioned between these the two correlation lines, each corresponding to the pulsation frequency f in any two consecutive bidimensional spectra in question.

The Z correlation lines (by adding the two lines corresponding to pulsation frequency f) are therefore temporally spaced by (1/f') in relation to each other.

For each correlation law, each of the P bidimensional spectra therefore contains Z corresponding correlation lines positioned in a manner that is identical in each of the P bidimensional spectra in relation to the position of the correlation line corresponding to the pulsation at the normal frequency f.

Steps of determination of the correlation laws of the method of the invention are then implemented at pulsation frequency f'.

It will be understood that this is not possible, at the highest pulsation frequency f' to determine to which ion packet each detected charged fragment belongs.

Step (e) of the method of the invention is therefore implemented by attributing time-of-flight measurements to the corresponding detected charged fragments to the Z×P packets of pulsed ions.

For each of the detected charged fragments of the Z×P ion packets, a time-of-flight determined from the start of the acquisition is first identified.

Then it is determined in which of the aforementioned P temporal segments between 0 and $T_{tot}$ is positioned each identified time-of-flight determined from the start of the acquisition.

Finally, a measured time-of-flight value is attributed to each charged fragment detected in each of the P temporal segments, between the origin of each temporal segment and the identified time-of-flight position, determined in relation to the start of the acquisition.

Then, on the two axes of the time-of-flight measurements of the P bidimensional spectra are positioned the attributed values of the time-of-flight measurements of the corresponding detected charged fragments.

Then, in step (f), the potential time-of-flight pairs $\{TOF_{r'}(m/q), TOF_{s'}(m/q)\}$ of each of the P bidimensional spectra with the time-of-flight measurements attributed to each of the corresponding P bidimensional spectra are generated at pulsation frequency f'.

To each potential pair $\{TOF_r(m/q), TOF_s(m/q)\}$ of each of the P bidimensional spectra there corresponds an occurrence position $P_{rs}$, in the plane of the corresponding bidimensional spectrum.

Finally, step (g) of the method of the invention is implemented at pulsation frequency f', for identifying the actual attributed time-of-flight pairs $\{TOF(m_t/q_t), TOF(m_u/q_u)\}$ from amongst the potential pairs $\{TOF_r(m/q), TOF_s(m/q)\}$ of each of the P bidimensional spectra, by retaining those whose two corresponding occurrence positions $(P_{tu}, P_{ut})$ in the plane $\{TOF_r(m/q), TOF_s(m/q)\}$ of each of the P bidimensional spectra are each at a distance from one of the correlation lines determined with the pulsation frequency f' that is less than a given threshold in the plane $\{TOF_r(m/q), TOF_s(m/q)\}$ of each bidimensional spectrum.

The charged fragments coming from the pairs of charged fragments injected in the same ion packet can be detected in two consecutive bidimensional spectra.

In order to identify said pairs, new potential pairs must be added to the set of potential pairs of the previous step (f).

They can be identified by generating the additional potential pairs with the attributed time-of-flight measurements of the two consecutive bidimensional spectra $\{TOF_{r'}(m/q), TOF_{s'}(m/q)\}$, where the time-of-flight measurements of one of the two bidimensional spectra are $TOF_r(m/q)$, and the time-of-flight measurements of the other spectrum are $TOF_{s'}(m/q)$.

In each of the P bidimensional spectra, the real pairs obtained from the dissociation of primary ions of like mass-to-charge ratio, but coming from several different ion packets, can therefore be identified by the distance threshold criterion in relation to the Z correlation lines corresponding to each correlation law.

By analogy, the identification of the triplets of charged fragments coming from the dissociation of multicharged primary ions can be similarly implemented by operating at high frequency, with a frequency pulsation f', steps (d) to (g) of the method of the invention.

And, in continuation with the graphical analogy used to describe the digital treatments of the invention, the P previous bidimensional spectra are then replaced by P three-dimensional spectra including three identical axes comprising the attributed time-of-flight measurements as previously described.

The real triplets of time-of-flight are identified among the potential triplets of time-of-flight of each of the P three-dimensional spectrum thanks to the distance threshold criterion of the corresponding positions in relation to the Z correlation spaces of each three-dimensional spectrum, given that the positions of the Z correlation spaces in each volume of each of the P three-dimensional spectra, corresponding to the dissociation into triplets of charged fragments, have been obtained in a similar way as in the bidimensional case previously described.

In the case of dissociation at low kinetic energy, some dissociated pairs of fragments can be injected into the time-of-flight space of the mass spectrometer into two different consecutive ion packets and/or can be detected in two consecutive bidimensional spectra.

These pairs of dissociated charged fragments cannot be identified, with the method of the invention, from amongst the potential pairs of the attributed time-of-flight measurements $\{TOF_r(m/q), TOF_s(m/q)\}$ and $\{TOF_r(m/q), TOF_{s'}(m/q)\}$ of each of the P bidimensional spectra, which allows us to identify only the pairs injected into the same ion packet, detected in the same bidimensional spectrum and in two consecutive bidimensional spectra.

To identify these pairs, it is necessary to add new potential pairs to all of the preceding potential pairs in the preceding step (f).

When the two fragments of these pairs of charged fragments pulsed by two consecutive ion packets are detected in the same bidimensional spectrum, it is possible to identify them by producing two other potential pairs, by adding and subtracting the value $\Delta TOF=(1/f')=(1/Z\times f)$ in relation to each of the other time-of-flight measurements, for each time-of-flight measurement.

The additional potential corresponding pairs $\{TOF_r(m/q), TOF_s(m/q)+\Delta TOF\}$ and $\{TOF_r(m/q), TOF_s(m/q)-\Delta TOF\}$ are then generated.

When the two fragments of the pairs of charged fragments are pulsed by two consecutive ion packets and detected in two consecutive bidimensional spectra, it is also possible to identify them by producing other potential pairs, adding to the previous additional pairs.

If the time-of-flight measurements of one of the two bidimensional spectra are $TOF_r(m/q)$, and the time-of-flight measurements of the other bidimensional spectrum are $TOF_{s'}(m/q)\}$, the new potential pairs with $\{TOF_r(m/q), TOF_s(m/q)+\Delta TOF\}$, and $\{TOF_r(m/q), TOF_{s'}(m/q)-\Delta TOF\}$ are generated.

All of the potential pairs of each of the P bidimensional spectra used to identify all the possible detected real pairs, are therefore $\{TOF_r(m/q), TOF_s(m/q)\}$, $\{TOF_r(m/q), TOF_{s'}(m/q)\}$, $\{TOF_r(m/q), TOF_s(m/q)+\Delta TOF\}$, $\{TOF_r(m/q), TOF_s(m/q)-\Delta TOF\}$, $\{TOF_r(m/q), TOF_{s'}(m/q)+\Delta TOF\}$, and $\{TOF_r(m/q)\ TOF_{s'}(m/q)-\Delta TOF\}$.

By analogy, it will be understood that calculations can also be used to deal with the case where the two fragments of the pairs of charged fragments are pulsed in two different non-consecutive ion packets, and detected in two non-consecutive bidimensional spectra.

Figure 11:
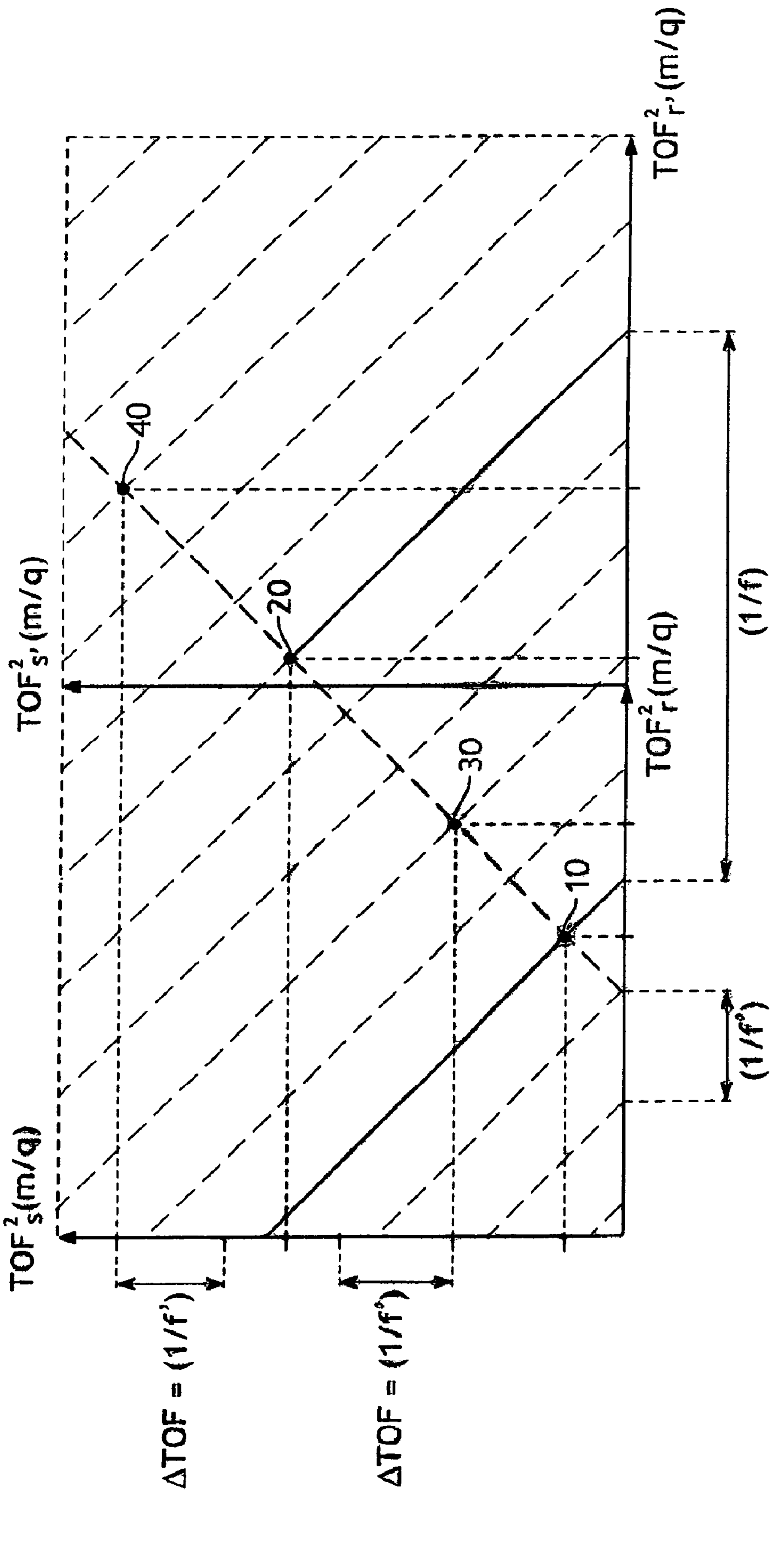
FIG. 11 illustrates four different examples of the identification of pairs of dissociated fragments coming from doubly-charged primary ions with like mass-to-charge ratio dissociating at low kinetic energy, in the case of pulsing the ion packets at a frequency f' which is higher than the normal frequency f, in the application of the method of the invention to a tandem time-of-flight mass spectrometer.

Four examples of identifications of pairs of charged fragments coming from the parent primary ions dissociation with like mass-to-charge ratio corresponding to the four previous possible cases from the same dissociation channel for primary ions dissociating at low kinetic energy are also shown in FIG. 11.

The position marked 10 corresponds to the case $\{TOF_r(m/q), TOF_s(m/q)\}$ of a pair of charged fragments pulsed in the same ion packet, and detected in the same bidimensional spectrum.

The position marked 20 corresponds to the case $\{TOF_r(m/q), TOF_s(m/q)\}$ of a pair of charged fragments pulsed in the same ion packet, and detected in the two consecutive bidimensional spectra.

The position marked 30 corresponds to the case $\{TOF_r(m/q), TOF_s(m/q)-\Delta TOF\}$ of a pair of charged fragments pulsed in two consecutive ion packets, and detected in the same bidimensional spectrum.

The position marked 40 corresponds to the case $\{TOF_{r'}(m/q), TOF_s(m/q)+\Delta TOF\}$ of a pair of charged fragments pulsed in two consecutive ion packets, and detected in the two consecutive bidimensional spectra.

In the case of the dissociation of the primary ions at high kinetic energy, the pairs are always obtained from the same pulsed ion packet, but can be detected in two consecutive bidimensional spectra.

To determine the real values of the time-of-flight measurements corresponding to the normal pulsation frequency f of the pairs of attributed identified time-of-flight measurements of the Z−1 correlation lines of each of the two dimensional spectra, the values corresponding to their correlation line position in relation to the correlation line corresponding to the normal pulsation frequency f is deducted (or added) to said attributed identified time-of-flight.

For example, for multiplets of attributed identified times-of-flight, positioned on correlation spaces immediately adjacent to the correlation space which corresponds to the normal pulsation frequency f, the value $\Delta TOF=(1/f')$ is deducted (or added) to said attributed time-of-flight to correct them and determine their real measured value.

In the example of FIG. 11, the positions of the four pairs of attributed identified time-of-flight corresponding to a same dissociation channel are located on a straight line perpendicular to their correlation lines, which is represented with a doted line. The positions 10 and 20, located on two correlation lines corresponding to the normal pulsation frequency f, are pairs of real time-of-flight measurements (the attributed values of the said two pairs are equal to their real measured values). The real measured values of the pairs located in the positions 30 and 40 are graphically determined by respectively projecting on positions 10 and 20 the positions 30 and 40 along the perpendicular doted line of FIG. 11 (what corresponds to an attributed time-of-flight correction by deduction (or addition) of values according to the position of their characteristic lines).

Finally, in step (h), each dissociation spectrum of each correlation law at the pulsation frequency f', corresponding to the normal pulsation frequency, is generated by cumulating the pairs of real identified time-of-flight measurements obtained with the set of corrected attributed identified times-of-flight of the Z correlation lines of each of the P two dimensional spectra.

Each dissociation spectrum corresponding to each peak of primary mass is finally generated with the mass dissociation spectra of the corresponding correlation laws obtained at the pulsation frequency f'.

Each dissociation mass spectrum obtained at the frequency $f'=Z\times f$ corresponding to the addition of the P two dimensional spectra is, as a consequence, identical to a mass spectrum obtained at the normal frequency and comprising $Z\times P$ ion packets pulsations.

Again, the value of the proximity criterion in relation to the correlation laws, corresponding to the distance threshold in relation to the position of the correlation lines in the preferred graphical method of implementation of the invention, determines the resolution of dissociation peaks obtained by the method of the invention.

In the case of low kinetic energy dissociation into triplets of charged fragments, as in the previous case of the pairs of dissociated charged fragments, some fragments of dissociated triplets can be injected in the time-of-flight space of the mass spectrometer into two different consecutive ion packets, but also into three different consecutive ion packets.

The different potential triplets corresponding to the different possible cases are:

$\{TOF_r(m/q), TOF_s(m/q), TOP_y(m/q)\}$, if the three fragments are injected in the same ion packet and detected in the same three-dimensional spectrum, $\{TOF_r(m/q), TOF_{s'}(m/q), TOP_{y'}(m/q)\}$, if the three fragments are injected in the same ion packet and detected in two consecutive three-dimensional spectra, $\{TOF_r(m/q), TOF_s(m/q), TOP_y(m/q)+/-\Delta TOF\}$, if the three fragments are injected in two consecutive ion packets and detected in the same three-dimensional spectrum, $\{TOF_{r'}(m/q), TOF_{s'}(m/q), TOP_y(m/q)+/-\Delta TOF\}$, if three fragments are injected into two consecutive ion packets and detected in two consecutive three-dimensional spectra, $\{TOF_r(m/q), TOF_s(m/q)+/-\Delta TOF, TOP_y(m/q)+/-2\Delta TOF\}\}$, if the three fragments are injected in three consecutive ion packets and detected in the same three-dimensional spectrum, $\{TOF_{r'}(m/q), TOF_{s'}(m/q)+/-\Delta TOF, TOP_y(m/q)+/-2\Delta TOF\}\}$, if the three fragments are injected in three consecutive ion packets and detected in two consecutive three-dimensional spectra.

By analogy, it is easy to understand that the calculations allow also the implementation of the case of three fragments of triplets of charged fragments pulsed into two (or three) different and non-consecutive ion packets, and detected in two (or three) non-consecutive three-dimensional spectra.

Of course, by analogy, the identification of multiplets of charged fragments can be similarly implemented by operating at high frequency, with a frequency pulsation f', to any multiplets of fragments comprising at least three charged fragments, and at least three charged fragments and a neutral fragment of known mass. However, this will not be described in detail as the skilled person is capable of such generalization, using the above examples.

The invention as described above for time-of-flight mass spectrometers has been explained using a graphical approach through the use of a two dimensional space with two dimensions (pairs of characteristic function values) containing correlation lines.

However, it will be understood that its concrete implementation is achieved typically by a digital computer such as a DSP (for "Digital Signal Processor") executing the appropriate programs.

In particular, the correlation laws will typically be numerical data (equations, such as, in the case of low kinetic energy dissociation, the equations (1), (3), (5), or sets of coordinates) with which the numerical characteristic function data generated by the spectrometers and supplied to the computer will be compared.

More practically, the present invention can be embodied in the form of a software module that is added to an existing time of flight mass spectrometry device, and interfaced with the other software of this equipment so as to perform, for the most part, the establishment of the correlation laws data and collection of the characteristic function data in order to compare them with these correlation laws data.

In the case of dissociation at high kinetic energy, if for the calibration of the correlation spaces, a device for the primary mass selection which so allows, such as a system 5 for primary mass selection by means of a time gate acting between the pulsation of each ion packet and the dissociation device 2, it is also possible to use this device to select all of the primary mass peaks of interest at each pulsation of the ion beam in order to effect the method of the invention, still without resorting to the selection of a primary mass peak, but by eliminating the other primary mass peaks which are not of interest, as described previously.

In the case of dissociation at low kinetic energy, the elimination of the primary mass peaks which are not of interest of the dissociation spectra can be implemented as described before, by positioning an ion trap 5 between the ion source 1 and the dissociation device 2, or using a quadrupolar-type mass spectrometer 5.

This allows us to limit the background noise detected, and as a consequence also the actual background noise of the false pairs of charged fragments identified in the dissociation spectra generated by the method of the invention.

The above devices 5 can also be used to eliminate, if necessary, the primary mass peaks corresponding to molecules which have been identified previously by the primary mass spectrum, rendering the acquisition of a spectrum MS-MS generally superfluous.

The method of the invention could be implemented to charged fragments obtained following the dissociation step, by concurrently dissociating them, in order to obtain multiplets of charged fragments from each of said parent charged fragments, in order to implement a method of multiple mass spectrometry $(MS)^n$.

If necessary, a preliminary step of selection of primary mass peaks of interest from the primary mass spectrum can be implemented.

Components and Operation of Spectrometers According to the Invention

Now will be described in greater detail, and by way of non-limiting examples, some preferred spectrometer components and spectrometer operations in a tandem mass spectrometer implementing the spectrometry method of the invention.

The ion source 1 can be continuous or pulsed, such as an ESI (Electro-Spray Ionisation) ion source, a MALDI (Matrix Assisted Laser Desorption Ionisation) pulsed laser ion source, an APCI (Atmospheric Pressure Chemical Ionisation) ion source, an APPI (Atmospheric Pressure Photo Ionisation)

ion source, a LDI (Laser Desorption Ionisation) ion source, an ICP (Inductively Coupled Plasma) ion source, en EI (Electron Impact) ion source, a CI (Chemical Ionisation) ion source, a FI (Field Ionisation) ion source, a FAB (Fast Atom Bombardment) ion source, a LSIMS (Liquid Secondary Ion Mass Spectrometry) ion source, an API (Atmospheric Pressure Ionisation) ion source, a FD (Field Desorption) ion source, a DIOS (Desorption Ionisation On Silicium) ion source, or any other type of multicharged ion source.

A dissociation system 2 at low kinetic energy can be a multipolar waveguide, an ion trap, a Fourier Transform mass spectrometer, or any other device allowing the generation of multiplets of charged fragments.

Besides, the dissociation at high kinetic energy can be implemented with a collision chamber containing gas that allows dissociation by CID/CAD (Collision Induced Dissociation/Collision Activated Dissociation), a time-of-flight space allowing spontaneous dissociation (PSD or Post Source Decay) after increasing the internal energy of the primary molecule ionised in the ion source or over the time-of-flight path by photo ionisation, or with the SID (Surface Induced Dissociation) technique, the ECD (Electron Capture Dissociation) technique, the IRMPD (Infra Red Multi Photon Dissociation) technique, the PD (Photo Dissociation) technique, the BIRD (Back Body Infra Red Dissociation) technique, or again any system for fragmentation of the primary ions.

When the dissociation of the primary ions is implemented by electron capture, said electron capture, which generates the fragmentation, modifies the primary ions charge Q before the dissociation step (d). The relation between the primary charge Q and the possible charge pairs of charged fragments ($q_{i'}$, $q_{j'}$) is then, for example:

$$Q-e=q_{i'}+q_{j'}.$$

The device 5 used to inject the primary ions corresponding the primary mass peaks of interest into the dissociation device 2 can be: a quadrupolar mass spectrometer, a 3D ion trap with a hyperbolic geometry, a linear 2D ion trap with a cylindrical geometry, or any other type of ion trap.

The mass spectrometer 3 used to generate the primary mass spectrum and the dissociation mass spectrum without primary mass selection can be one of the following group: a time-of-flight mass spectrometer, a magnetic sector mass spectrometer, a quadrupolar mass spectrometer, an ion trap, a FTICR mass spectrometer, or any other type of mass spectrometer.

The time-of-flight space 3 between the ion packet pulsation and the ion detector 4 can be rectilinear, or equipped with a reflectron.

In this case, the reflectron can be of the single-stage or two-stage type, of the Curved Field Reflectron (CFR) type, or a quadratic or any other type of reflectron.

The pulse of each ion packets can be implemented in the ion source 1, between the ion source and the dissociation device, or between the dissociation device 2 and the ion detector 4.

The pulse of the ion packet, which is necessary for a time-of-flight mass spectrometer when the ion source is continuous, can be implemented by one of the following techniques: scan of the continuous beam of ions through a notch, application of a variable electric field between two deflection plates, orthogonal injection by application of a variable electric field between two electrodes perpendicularly to the continuous ions beam.

The ion trap 3 can be: a 3D ion trap with a hyperbolic geometry, a linear 2D ion trap with a cylindrical geometry, or any other type of ion trap.

The Fourier Transform mass spectrometer can be a FTICR mass spectrometer that uses a static magnetic field or a radial logarithmic electrical field to store the ions.

The ion detector 4, implementable with time-of-flight mass spectrometers, can be composed of at least one micro Channel Plate (MCP), with at least one anode, each anode being equipped with electronic counting composed of an amplifier, a discriminator, and a Time Digital Converter (TDC), or any other type of ion detector employed to measure the characteristic function values, on this detector, of each primary ion and of each charged fragment detected.

Now will be described four non-limiting methods of implementation of mass spectrometers based on the use of the components illustrated in FIGS. 2 and 8.

First Method of Implementation of a Spectrometer

Figure 2:
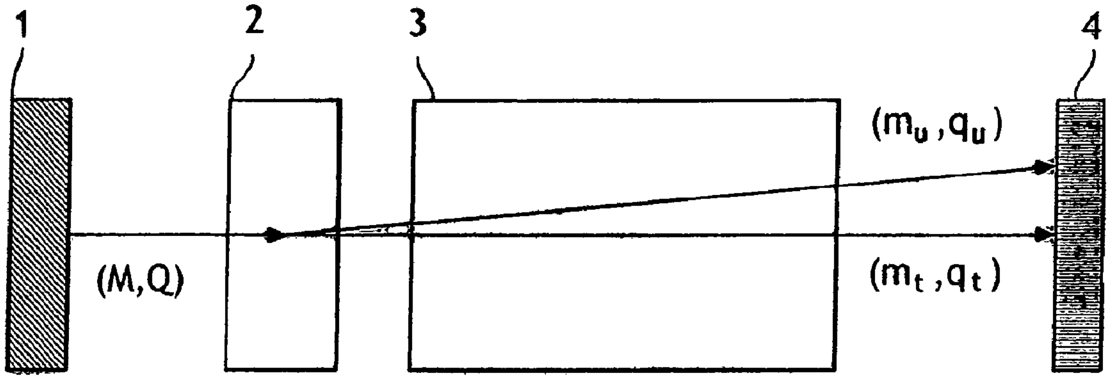
FIG. 2 illustrates components of a system designed to implement the method of mass spectrometry according to one example of the invention.

The first method of implementation of a tandem mass spectrometer according to the invention is illustrated in FIG. 2.

It includes, in succession, in the general direction of movement of the primary ions, an electro-spray ionisation (ESI) multicharged ion source 1, a dissociation device 2 comprising a multipolar waveguide q containing gas producing dissociation of the primary ions by CID at low kinetic energy, a time-of-flight mass spectrometer 3 including a device for pulsing the ion beam by orthogonal injection and a time-of-flight space with a reflectron, and an ion detector 4.

This embodiment for a tandem mass spectrometer is known by the skilled person who uses tandem mass spectrometers with primary mass selection Q-q-TOF, further equipped with a quadrupolar mass spectrometer, in order to implement the selection of primary mass in mode MS-MS.

The first embodiment is consequently identical to said devices, except that it does not comprise the quadrupolar mass spectrometer Q.

First, the primary mass spectrum is generated with the time-of-flight mass spectrometer with orthogonal injection, without mass dissociation into the multipolar waveguide q.

Then, the mass dissociation spectrum is generated without primary mass selection, still in the time-of-flight mass spectrometer, after the primary ions dissociation into multiplets of charged fragments inside the multipolar waveguide q by CID, at low kinetic energy.

The multiplets of dissociation peaks are identified for each of the dissociation peaks corresponding to primary mass peak, according to the method of the invention, and finally each dissociation spectra, comprising the multiplets of mass dissociation peaks of a corresponding primary ion, is generated.

To increase the duty cycle in MS-MS mode from typically 5-30% to about 100%, the invention can be implemented, in steps (d) to (g), at higher frequency $f'=Z\times f$, with individual identifications of charged multiplets after each ion packet pulsation. For normal frequency pulsation f=10 kHz, f' can be chosen as f'=200 kHz with Z=20.

In one embodiment of the first implementation of the invention, as illustrated in FIG. 8, the device is equipped with either a quadrupolar mass spectrometer or an ion trap, positioned between the ion source 1 and the dissociation device 2, in order to select simultaneously, with a large mass window, several primary mass peaks of interest, and to reduce the number of false multiplets of dissociation mass peaks, identified with the method of the invention.

In another embodiment of the first implementation of the method of the invention, a LC (Liquid Chromatography) molecule separation device can be positioned upstream of the ion source 1.

Second Method of Implementation of a Spectrometer

The second method of implementation of a tandem mass spectrometer according to the invention is illustrated in FIG. 2.

It includes, in succession, in the general direction of movement of the primary ions, an Electro-Spray Ionisation (ESI) multicharged ion source 1, a linear 2D ion trap with a cylindrical geometry 2, 3, and an ion detector 4.

In this embodiment, the ion trap is used both as a dissociation device 2 and a mass spectrometer 3.

This embodiment of the tandem mass spectrometer is known by the skilled person who uses identical mass spectrometer to generate mass dissociation spectra with mass selection.

First, the primary mass spectrum is generated with the ion trap 2, 3 after storage of the primary ions emitted by the ions source 1, without dissociation.

Then, the mass dissociation spectrum is generated without primary mass selection with the ion trap, after the primary ions dissociation into multiplets of charged fragments by CID with the gas molecules contained inside the ion trap, at low kinetic energy.

The multiplets of dissociation peaks are identified for each of the dissociation peaks corresponding to primary mass peak, according to the method of the invention, and finally each dissociation spectra, comprising the multiplets of mass dissociation peaks of a corresponding primary ion, is generated.

In one embodiment of the second implementation of the invention, a LC (Liquid Chromatography) molecule separation device can be positioned upstream of the ion source 1.

In another embodiment of the first implementation of the invention, a 3D ion trap with a hyperbolic geometry is substituted for the 2D ion trap.

In a further embodiment of the second implementation of invention, as illustrated in FIG. 8, the device is equipped with either a quadrupolar mass spectrometer 5 or an ion trap 5, positioned between the ion source 1 and the dissociation device 2, in order to reduce the number of false multiplets of dissociation mass peaks, identified with the method of the invention. The quadrupolar further allows the simultaneous selection, with a large mass window, of several primary mass peaks of interest, while the ion trap further allows the simultaneous selection of all the primary mass peaks of interest.

In addition to this embodiment, as illustrated in FIG. 8, the device can further be equipped with a multipolar ion guide 2, positioned between the quadripolar mass spectrometer (respectively the ion trap 5) and the ion trap 3, to dissociate the primary ions by CID before the injection of the charged fragments into the ion trap 3.

Third Method of Implementation of a Spectrometer

The third method of implementation of a tandem mass spectrometer according to the invention is illustrated in FIG. 2.

It includes, in succession, in the general direction of movement of the primary ions, an Electro-Spray Ionisation (ESI) multicharged ion source 1, a linear 3D ion trap with a hyperbolical geometry 2, a time-to-flight mass spectrometer 3 with a reflectron, and an ion detector 4.

In this embodiment, the ion trap 2 is use to pulse each ion packet in order to generate the time-of-flight measurements.

This embodiment of the tandem mass spectrometer is known by the skilled person who uses identical mass spectrometer to generate mass dissociation spectra with mass selection.

First, the primary mass spectrum is generated with the time-to-flight mass spectrometer, after storage of the primary ions emitted by the ions source 1, without dissociation, and after the pulse of ion packet through the space of time-of-flight.

Then, the mass dissociation spectrum is generated without primary mass selection with the ion trap, after the primary ions dissociation into multiplets of charged fragments by CID with the gas molecules contained inside the ion trap, at low kinetic energy.

The multiplets of dissociation peaks are identified for each of the dissociation peaks corresponding to primary mass peak, according to the method of the invention, and finally each dissociation spectra, comprising the multiplets of mass dissociation peaks of a corresponding primary ion, is generated.

In one embodiment of the third implementation of the invention, a LC (Liquid Chromatography) molecule separation device can be positioned upstream of the ion source 1.

Fourth Method of Implementation of a Spectrometer

The fourth method of implementation of a tandem mass spectrometer according to the invention is illustrated in FIG. 2.

It includes, in succession, in the general direction of movement of the primary ions, an Electro-Spray Ionisation (ESI) multicharged ion source 1, a FT-ICR Fourier Transform mass spectrometer 2, 3, and a detector 4 measuring the cyclotron frequency.

In this embodiment, FT-ICR Fourier Transform mass spectrometer is used both as a dissociation device 2 and a mass spectrometer 3.

This embodiment of the tandem mass spectrometer is known per se to the skilled person who uses identical mass spectrometer to generate mass dissociation spectra with mass selection.

First, the primary mass spectrum is generated with the FT-ICR Fourier Transform mass spectrometer, after storage of the primary ions emitted by the ions source 1, without dissociation.

Then, the mass dissociation spectrum is generated without primary mass selection with the Fourier Transform spectrometer, after the primary ions dissociation into multiplets of charged fragments by collision induced dissociation (CID) with the molecules of a neutral gas, or by electron capture dissociation (ECD) in the volume of said spectrometer, at low kinetic energy.

The multiplets of dissociation mass are identified for each of the dissociation peaks corresponding to primary mass peak, according to the method of the invention, and finally each dissociation spectra, comprising the multiplets of mass dissociation peaks, is generated, In one embodiment of the fourth implementation of the invention, a LC (Liquid Chromatography) molecule separation device can be positioned upstream of the ion source 1.

In another embodiment of the fourth implementation of invention, as illustrated in FIG. 8, the device is equipped with either a quadrupolar mass spectrometer 5 or an ion trap 5, positioned between the ion source 1 and the dissociation device 2, in order to reduce the number of false multiplets of dissociation mass peaks, identified with the method of the invention. The quadrupolar Q further allows the simultaneous selection, with a large mass window, of several primary mass peaks of interest, while the ion trap further allows the simultaneous selection of all the primary mass peaks of interest.

In addition to this embodiment, as illustrated in FIG. 8, the device can further be equipped with a multipolar ion guide 2, positioned between the quadripolar mass spectrometer (respectively the ion trap 5) and the FT-ICR Fourier Transform mass spectrometer 3, to dissociate the primary ions by CID before the injection of the charged fragments into the FT-ICR Fourier Transform mass spectrometer 3.

BIBLIOGRAPHICAL REFERENCES

[1] J. D. Pinston et al, Rev. Sci. Instrum., 57 (4), (1983), p. 583. C. G. Enke et al, U.S. Pat. No. 4,472,631 (1984).

[2] S. Della-Negra and Y. Leybec, Anal. Chem., 57 (11), (1985), p. 2035. K. G. Standing et al, Anal. Instrumen., 16, (1987), p; 173. R. J. Conzemius U.S. Pat. No. 4,894,536 (1990).

[3] Alderdice et al, U.S. Pat. No. 5,206,508 (1993).

[4] R. H. Bateman, J. M. Brown, D. J. Kenny, US patent 2005/0098721 A1 (2005).

[5] C. G. Enke, patent PCT/US2004/008424.

[6] R. D. Smith et al, U.S. Pat. No. 5,073,713 (1991).

The invention claimed is:

1. A method of tandem mass spectrometry for use in a mass spectrometer having a known characteristic function of the mass-to-charge ratio of the ions to be analysed, characterized in that it comprises the following steps:

(a) providing a primary ions source to be analysed, (b) generating a primary mass spectrum of the primary ions, without dissociation, wherein said spectrum contains primary ion peaks of occurrence, (c) from the characteristic function values at the maxima of at least some of said primary mass peaks and from the charge values associated to said peaks, determining correlation laws that all possible multiplets of characteristic function values corresponding to multiplets of charged fragments resulting from the dissociation of parent primary ions of interest corresponding to said primary mass peaks have to meet, (d) concurrently dissociating primary ions of interest associated to primary mass peaks, in order to obtain multiplets of charged fragments from each of said parent primary ions, (e) generating characteristic function values for the dissociated fragments, (f) forming every potential multiplet of said characteristic function values, (g) identifying, from amongst said potential multiplets, the multiplets which meet a proximity criterion in relation to said correlation laws, in order to determine the real multiplets of charged fragments corresponding to the parent primaryy ions, (h) generating dissociation mass spectra corresponding respectively to the parent primary ions of interest, comprising the peaks associated to the real multiplets of identified fragments.

2. The method of claim 1, wherein the dissociation of a primary ion of interest may generate neutral fragments having a known mass, and wherein the step of determining said correlation laws takes into account such potential loss of mass.

3. A method according to claim 1 or 2, wherein, if N is denoted as the maximal number of potential multiplets, the correlation laws for such multiplets are spaces having a dimension equal to N−1.

4. A method according to claim 1, wherein the step of determining said correlation laws is performed before the step of generating the characteristic function values for the dissociated fragments.

5. A method according to claim 1, wherein the step of determining said correlation laws is performed subsequently to the step of generating the characteristic function values for the dissociated fragments.

6. A method according to claim 1, wherein the characteristic function of the charged dissociated fragments depends on the mass-to-charge ratio of the dissociated fragments and is independent from the mass-to-charge ratio of the parent primary ions.

7. A method according to claim 1, wherein the characteristic function of the charged dissociated fragments is proportional to the mass-to-charge ratio of the dissociated fragments.

8. A method according to claim 1, wherein the correlation laws are determined by calculation.

9. A method according to claim 1, wherein the characteristic function of the charged dissociated fragments depends on the mass-to-charge ratio of the dissociated fragment (m/q) and on the mass-to-charge ratio of the parent primary ions (MA)).

10. A method according to claim 1, wherein the correlation laws are determined by use of calibration data obtained with ions of known mass and charge.

11. The method of claim 10, wherein the step of determining said correlation laws includes the following substeps:

(d1) generating a primary mass spectrum for ions of known mass and charge, (d2) selecting a primary mass peak in said spectrum, (d3) dissociating selected primary ions in order to obtain a given mass-to-charge ratio (M/Q), (d4) generating a dissociation mass spectrum of the dissociated fragments coming from the selected primary ions, (d5) identifying, in the dissociation mass spectrum, the multiplets of peaks corresponding to the events for dissociation into multiplets of charged fragments, (d6) determining the characteristic function values corresponding to the maximum of occurrences ($F_{max}$(m/q)) of each peak belonging to each multiplet identified, (d7) determining, for each possible charge multiplet, each of the correlation laws with the identified multiplets of characteristic function values that satisfy this charge multiplet, and that correspond to the mass-to-charge ratio (M/Q), to the primary charge Q, and to the characteristic function values at maxima of occurrences ($F_{max}$(M/Q)) for the selected primary mass peak, and (d8) repeating steps (d1) to (d7) for each selected primary mass peak of the primary mass spectrum of the known molecules.

12. The method of claim 11, further comprising a step of determining correlation laws of primary mass peaks for unknown molecules on the basis of the correlation laws obtained with the known molecules.

13. The method of claim 9 or 10, wherein the determined correlation laws are defined by sets of coordinates.

14. A method according to claim 1, wherein the determined correlation laws are defined analytically.

15. A method according to claim 1, further comprising a step of selecting a group of different primary ions of interest by primary mass selection.

16. The method of claim 15, wherein the step of selection of the primary ions of interest is implemented before the step of generating the characteristic function values for the dissociated fragments.

17. A method according to claim 1, wherein the proximity criterion is adjustable.

18. A method according to claim 1, wherein steps (e) to (g) are performed for accumulated occurrences of potential multiplets of values, and wherein the characteristic function values as determined in step (e) are those at the maxima of peaks formed by said accumulated occurrences.

19. A method according to claim 1, wherein steps (e) to (g) are performed for multiplets resulting from individual dissociation events, and wherein step (h) is performed by accumulating occurrences of the real multiplets identified.

20. A method according to claim 1, wherein the values of said characteristic function are time-of-flight related.

21. The method of claim 20, wherein the dissociated ions are contained in successive periodic ion pulses, the pulsation period is shorter than the longest time of flight of the dissociated charged fragments to be measured, wherein steps (d) and (e) are performed with an overlap between consecutive pulses, and wherein step (c) includes determining correlation laws for all possible multiplets of characteristic function values corresponding to multiplets of charged fragments resulting from the dissociation of parent primary ions of interest contained in preceding ion pulses.

22. A tandem mass spectrometer, comprising in combination:

(a) a source (1) of multicharged primary ions to be analysed, (b) a device (3) for generating a primary mass spectrum of the primary ions, without dissociation, where said spectrum contains primary ion peaks of occurrence, (c) a set of correlation laws determined from the characteristic function values at the maxima of at least some of said primary mass peaks and from the charge values associated to said peaks, and that all possible multiplets of characteristic function values corresponding to multiplets of charged fragments resulting from the dissociation of parent primary ions of interest corresponding to said primary mass peaks have to meet, (d) a dissociation device (2) adapted to dissociate primary ions of interest associated to primary mass peaks, in order to obtain multiplets of charged fragments from each of said parent primary ions, (e) a device for generating and storing characteristic function values for the dissociated fragments, (f) a processing device for forming every potential multiplet of said characteristic function values, for identifying, from amongst said potential multiplets, the multiplets which meet a proximity criterion in relation to said correlation laws, in order to determine the real multiplets of charged fragments corresponding to the parent primary ions, and for generating dissociation mass spectra corresponding respectively to the parent primary ions of interest, comprising the peaks associated to the real multiplets of identified fragments.

23. The spectrometer of claim 22, further comprising a primary mass selection device for selecting a group of different primary ions of interest.

24. The spectrometer of claim 23, wherein said primary mass selection device comprises an ion trap.

25. The spectrometer of claim 23, wherein said primary mass selection device comprises a quadrupolar.

26. The spectrometer of claim 23, wherein said primary mass selection device comprises a temporal gate.

27. A spectrometer according to any one of claims 22 to 26, wherein said dissociation device is a multipolar wave guide.

28. A spectrometer according to claim 22, characterized in that it comprises a time-of-flight mass spectrometer.

29. The spectrometer of claim 28, wherein the dissociation device is positioned before an ion accelerator to inject ion packets into the time-of-flight space of the time-of-flight spectrometer.

30. The spectrometer of claim 28, wherein the dissociation device is positioned after an ion accelerator to inject ion packets into the time-of-flight space of the time-of-flight spectrometer.

31. The spectrometer of claim 29 or 30, wherein said ion accelerator comprises an orthogonal injection device.

32. A spectrometer according to claim 28, further comprising a reflectron.

33. The spectrometer according to claim 22, wherein the multicharged ion source (1) is an electro-spray ionisation ion source.

34. A computer readable storage medium storing a computer program for a mass spectrometry system comprising a mass spectrometer having a known characteristic function of the mass-to-charge ratio of ions, said computer program including a set of instructions which when executed by a digital computer perform the following steps:

(a) controlling the system so that it generates, from a source of multicharged primary ions to be analysed, a primary mass spectrum of said primary ions, without dissociation, where this spectrum contains peaks of occurrences of primary ions, (b) performing an acquisition of the data of this spectrum, including characteristic function values at the maxima of at least some of the primary mass peaks and from the charge values associated to said peaks, (c) from said data, determining correlation laws that all possible multiplets of characteristic function values corresponding to multiplets of charged fragments resulting from the dissociation of parent primary ions of interest corresponding to said primary mass peaks have to meet, (d) controlling the system so that it generates the concurrent dissociation of primary ions of interest associated to primary mass peaks so as to obtain multiplets of charged fragments from each of said parent primary ions, and to generate characteristic function values for said dissociated fragments, (e) forming every potential multiplet of said characteristic function value, (f) identifying, from amongst said potential multiplets, the multiplets which meet a proximity criterion in relation to said correlation laws, in order to determine the real multiplets of charged fragments corresponding to the parent primary ions, and (g) generating dissociation mass spectra corresponding respectively to the parent primary ions of interest, comprising the peaks associated to the real multiplets of identified fragments.

35. The computer program of claim 34, wherein steps (e) to (f) are performed for accumulated occurrences of potential multiplets of values, and wherein the characteristic function values as determined in step (d) are those at maxima of the peaks formed by said accumulated occurrences.

36. The computer program of claims 34, wherein steps (e) to (f) are performed for multiplets resulting from individual dissociation events, and wherein step (g) is performed by accumulating occurrences of the real multiplets identified.

* * * * *